(12) United States Patent  
Shimabe et al.

(10) Patent No.: US 11,899,788 B2  
(45) Date of Patent: Feb. 13, 2024

(54) ATTACK TREE GENERATION DEVICE, ATTACK TREE GENERATION METHOD, AND COMPUTER READABLE MEDIUM

(71) Applicant: Mitsubishi Electric Corporation, Tokyo (JP)

(72) Inventors: Ryosuke Shimabe, Tokyo (JP); Takeshi Asai, Tokyo (JP); Kiyoto Kawauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 391 days.

(21) Appl. No.: 17/244,515

(22) Filed: Apr. 29, 2021

(65) Prior Publication Data

US 2021/0248231 A1    Aug. 12, 2021

Related U.S. Application Data

(63) Continuation of application No. PCT/JP2019/050000, filed on Dec. 20, 2019.

(30) Foreign Application Priority Data

Dec. 27, 2018 (WO) .................. PCT/JP2018/048282

(51) Int. Cl.  
*G06F 21/55* (2013.01)

(52) U.S. Cl.  
CPC ...... *G06F 21/554* (2013.01); *G06F 2221/034* (2013.01)

(58) Field of Classification Search  
CPC . G06F 21/554; G06F 2221/034; G06F 21/577

(Continued)

(56) References Cited

U.S. PATENT DOCUMENTS 7,162,741 B2 * 1/2007 Eskin .................. H04L 63/1416  
    726/25  
8,429,708 B1 * 4/2013 Tandon ................ G06F 21/604  
    713/153

(Continued)

FOREIGN PATENT DOCUMENTS

CN     107077563 A     8/2017  
JP     4-302364 A     10/1992

(Continued)

OTHER PUBLICATIONS

Asai et al., "Automatic generation of attack tree for selecting cybersecurity measures", SCIS2018, Symposium on Cryptography and Information Security, Niigata, Japan, Jan. 23-26, 2018, total 8 pages.

(Continued)

*Primary Examiner* — Teshome Hailu  
(74) *Attorney, Agent, or Firm* — BIRCH, STEWART, KOLASCH & BIRCH, LLP

(57) ABSTRACT

A system dividing unit (110) divides a target system into a plurality of sub-systems. A root system selection unit (122) selects a sub-system in which a threat on security occurs, as a root system from among the plurality of sub-systems. A root tree generation unit (131) generates an attack tree of the root system, as a root tree. A descendant system selection unit (132) selects one sub-system or more located on an intrusion course to the root system, as one descendent system or more from among the plurality of sub-systems. A descendant tree generation unit (133) generates one attack tree or more corresponding to the one descendent system or more, as one descendent tree or more. A sub-attack tree integration unit (140) integrates the root tree and the one descendent tree or more, to thereby generate an attack tree of the target system.

12 Claims, 22 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 11,652,839 | B1* | 5/2023 | Aloisio | H04L 63/1433 |
| | | | | 726/25 |
| 2009/0049553 | A1* | 2/2009 | Vasudeva | H04L 67/02 |
| | | | | 726/25 |
| 2012/0304249 | A1 | 11/2012 | Luo et al. | |
| 2014/0173744 | A1* | 6/2014 | Borohovski | H04L 63/1433 |
| | | | | 726/25 |
| 2015/0304349 | A1* | 10/2015 | Bernstein | H04L 63/1425 |
| | | | | 726/22 |
| 2017/0277887 | A1 | 9/2017 | Ijiro et al. | |
| 2018/0181750 | A1* | 6/2018 | Lamothe-Brassard | |
| | | | | G06F 21/554 |

FOREIGN PATENT DOCUMENTS

| | | |
|---|---|---|
| JP | 6-187154 A | 7/1994 |
| JP | 7-295854 A | 11/1995 |
| JP | 2003-92603 A | 3/2003 |
| JP | 2006-23916 A | 1/2006 |
| JP | 2013-512489 A | 4/2013 |
| JP | 2015-41167 A | 3/2015 |
| JP | 6058246 B2 | 1/2017 |

OTHER PUBLICATIONS

International Search Report for PCT/JP2018/048282 dated Apr. 9, 2019.
International Search Report for PCT/JP2019/050000 dated Jan. 21, 2020.
Ou et al., "MulVAL: A Logic-based Network Security Analyzer", 14th USENIX Security Symposium, 2005, pp. 113-128.
Schneier, "Attack Trees", Schneier on Security, <https://www.schneier.com/academic/archives/1999/12/attack_trees.html>, Dec. 1999, total 8 pages.
Yi et al., "Overview on Attack Graph Generation and Visualization Technology", International Conference on Anti-Counterfeiting, Security and Identification (ASID), 2013, total 6 pages.
Chao et al., "Improved logic system and quantification technology for security protocols," China Academic Journal Electronic Publishing House, vol. 29, No. 21, Nov. 2008, pp. 5415-5419, with an English abstract.
Chinese Office Action and Search Report for Chinese Application No. 201980085372.X, dated Dec. 2, 2023, with English translation.

* cited by examiner

ATTACK TREE GENERATION DEVICE, ATTACK TREE GENERATION METHOD, AND COMPUTER READABLE MEDIUM

CROSS REFERENCE TO RELATED APPLICATIONS

This application is a Continuation of PCT International Application No. PCT/JP2019/050000, filed on Dec. 20, 2019, which claims priority under 35 U.S.C. 119(a) to Patent Application No. PCT/JP2018/048282, filed in Japan on Dec. 27, 2018, all of which are hereby expressly incorporated by reference into the present application.

TECHNICAL FIELD

The present invention relates to a technique to generate an attack tree of a system that is a target of a security countermeasure.

BACKGROUND ART

In recent years, cyber attacks on information systems and control systems have become serious in companies, and sufficient security countermeasures are required.

An attack tree automatic generation tool has been proposed as a technique to support security countermeasures. This tool takes as input configuration information of a system to be analyzed, and analyzes a scenario (attack scenario) of steps toward an occurrence of a cyber attack. For example, the configuration information of the system includes information on devices, communication paths, applications, security countermeasures, and so on.

An attack tree is a tree-like integration of one attack scenario or more outputted from the attack tree automatic generation tool.

In the attack tree, attack information on a device to be attacked, an application to be attacked, an attack technique, and so on are described. Therefore, by referring to the attack tree, a system developer can study the security countermeasure.

Non-Patent Literature 1 discloses a description regarding an attack tree.

Non-Patent Literature 2 and Non-Patent Literature 3 propose an attack tree automatic generation tool of a logical inference type.

With the attack tree automatic generation tool of the logical inference type, a condition under which a cyber attack occurs is defined as a logical proposition. This tool converts configuration information of a system to be analyzed into a logical formula and generates an attack tree by formal inference.

Non-Patent Literature 2 is a survey paper on attack tree automatic generation tools proposed by the year 2013.

In Non-Patent Literature 2, referring to TABLE 1. Attack Graph Generation and Visualization Tools Comparison, a tool whose Attack Graph Type is categorized under a Logical attack graph corresponds to an attack tree automatic generation tool of a logical inference type.

Non-Patent Literature 3 proposes an attack tree automatic generation tool called MulVAL.

MulVAL uses a logical programming language called Prolog. MulVAL performs inference based on first-order predicate logic and generates an attack tree. It is considered that for a scale N of a system, an amount of calculation is on the order of from N squared to N cubed.

Patent Literature 1 will be referred to in an embodiment.

CITATION LIST

Patent Literature

Patent Literature 1: JP 6058246 B2

Non-Patent Literature

Non-Patent Literature 1: Schneier, Bruce (December 1999). "Attack Trees", <https://www.schneier.com/academic/archives/1999/12/attack_trees.html>

Non-Patent Literature 2: Shengwei Yi, Yong Peng, Qi Xiong, Ting Wang, Zhonghua Dai, Haihui Gao, Junfeng Xu, Jiteng Wang, Lijuan Xu, "Overview on attack graph generation and visualization technology," International Conference on Anti-Counterfeiting, Security and Identification (ASID), 2013.

Non-Patent Literature 3: X. Ou, S. Govindavajhala, and A. Appel., "MulVAL: A logic-based network security analyzer," 14th USENIX Security Symposium, pages 113-128, 2005

SUMMARY OF INVENTION

Technical Problem

An attack tree automatic generation tool of a logical inference type has a problem that an amount of calculation increases on the order of polynomials for a scale of a system.

Therefore, it takes time to study a countermeasure that uses an attack tree, and a cost of system development increases.

An objective of the present invention is to make it possible to reduce an amount of calculation required to generate an attack tree.

Solution to Problem

An attack tree generation device of the present invention includes:

a system dividing unit to divide a target system that is a target of a security countermeasure, into a plurality of sub-systems based on system configuration data indicating a configuration of the target system;

a root system selection unit to select a sub-system in which a threat on security in the target system occurs, as a root system from among the plurality of sub-systems based on threat data indicating a content of the threat;

a root tree generation unit to execute an attack tree generation process on the root system, to thereby generate an attack tree of the root system as a root tree;

a descendant system selection unit to select one sub-system or more located on an intrusion course to the root system in the target system, as one descendent system or more from among the plurality of sub-systems based on intrusion course data indicating the intrusion course;

a descendant tree generation unit to execute the attack tree generation process on each of the one descendent system or more, to thereby generate one attack tree or more corresponding to the one descendent system or more, as one descendent tree or more; and a sub-attack tree integration unit to integrate the root tree and the one descendent tree or more, to thereby generate an attack tree of the target system.

Advantageous Effects of Invention

According to the present invention, an amount of calculation required to generate an attack tree of a target system can be reduced.

DESCRIPTION OF EMBODIMENTS

Figure 1:
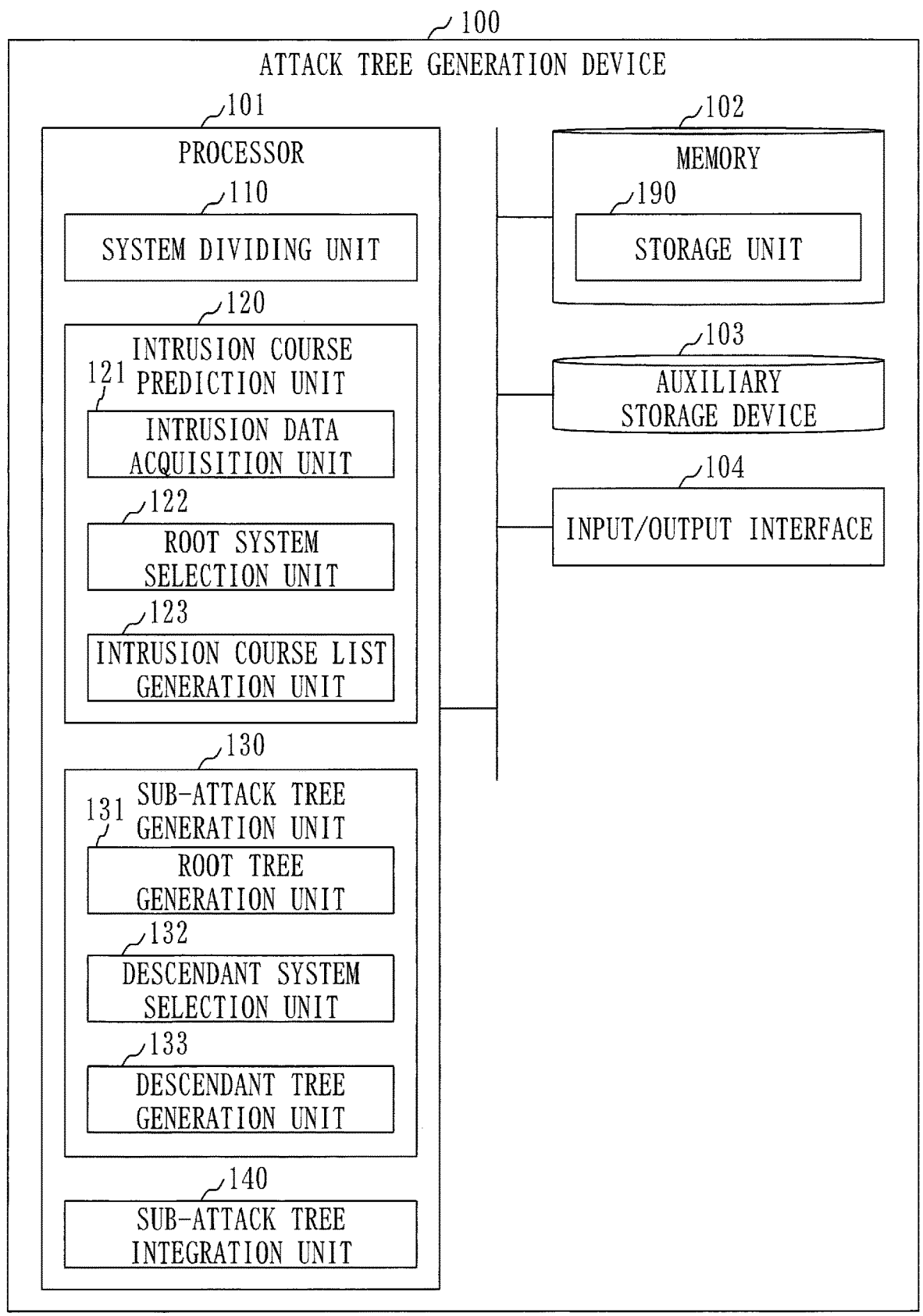
FIG. 1 is a configuration diagram of an attack tree generation device 100 in Embodiment 1.

In embodiments and drawings, the same element or equivalent element is denoted by the same reference sign. Description of an element denoted by the same reference sign as a described element will be appropriately omitted or simplified. Arrows in the drawings mainly illustrate data flows or process flows.

Embodiment 1

An attack tree generation device 100 will be described with referring to FIGS. 1 to 11.

The attack tree generation device 100 generates an attack tree of each of a plurality of sub-systems, and integrates a plurality of attack trees corresponding to the plurality of sub-systems. Hence, an attack tree of an entire system can be obtained.

*Description of Configurations*

A configuration of the attack tree generation device 100 will be described with referring to FIG. 1.

The attack tree generation device 100 is a computer provided with hardware devices such as a processor 101, a memory 102, an auxiliary storage device 103, and an input/output interface 104. These hardware devices are connected to each other via signal lines.

The processor 101 is an Integrated Circuit (IC) that performs computation processing, and controls the other hardware devices. The processor 101 is, for example, a Central Processing Unit (CPU), a Digital Signal Processor (DSP), or a Graphics Processing Unit (GPU).

The memory 102 is a volatile storage device. The memory 102 is called a main storage device or a main memory as well. The memory 102 is, for example, a Random-Access Memory (RAM). Data stored in the memory 102 is saved in the auxiliary storage device 103 as necessary.

The auxiliary storage device 103 is a nonvolatile storage device. The auxiliary storage device 103 is, for example, a Read-Only Memory (ROM), a Hard Disk Drive (HDD), or a flash memory. Data stored in the auxiliary storage device 103 is loaded into the memory 102 as necessary.

The input/output interface 104 is a port to which an input device and an output device are connected. For example, the input/output interface 104 is a USB terminal, the input device includes a keyboard and a mouse, and the output device is a display. Note that USB stands for Universal Serial Bus.

The attack tree generation device 100 is provided with elements such as a system dividing unit 110, an intrusion course prediction unit 120, a sub-attack tree generation unit 130, and a sub-attack tree integration unit 140. These elements are implemented by software.

The intrusion course prediction unit 120 is provided with an intrusion data acquisition unit 121, a root system selection unit 122, and an intrusion course list generation unit 123.

The sub-attack tree generation unit 130 is provided with a root tree generation unit 131, a descendant system selection unit 132, and a descendant tree generation unit 133.

An attack tree generation program to cause the computer to function as the system dividing unit 110, the intrusion course prediction unit 120, the sub-attack tree generation unit 130, and the sub-attack tree integration unit 140 is stored in the auxiliary storage device 103. The attack tree generation program is loaded into the memory 102 and executed by the processor 101.

Furthermore, an Operating System (OS) is stored in the auxiliary storage device 103. At least part of the OS is loaded into the memory 102 and executed by the processor 101.

That is, the processor 101 executes the attack tree generation program while executing the OS.

Input/output data of the attack tree generation program is stored in a storage unit 190.

The memory 102 functions as the storage unit 190. Alternatively, a storage device such as the auxiliary storage device 103, a register in the processor 101, and a cache memory in the processor 101 may function as the storage unit 190 in place of the memory 102 or together with the memory 102.

The attack tree generation device 100 may be provided with a plurality of processors that substitute for the processor 101. The plurality of processors share a role of the processor 101.

The attack tree generation program can be computer readably recorded (stored) in a nonvolatile recording medium such as an optical disk and a flash memory.

Figure 2:
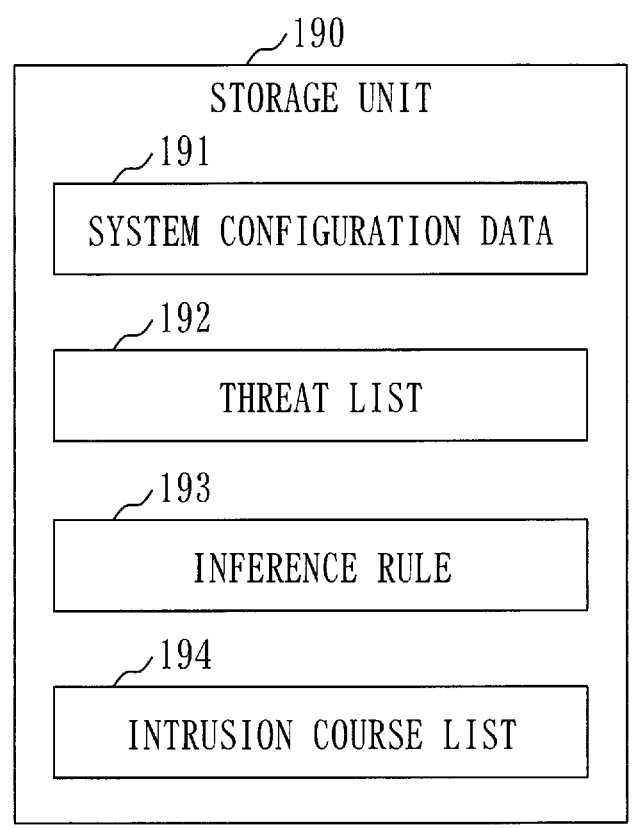
FIG. 2 is a configuration diagram of a storage unit 190 in Embodiment 1.

A configuration of the storage unit 190 will be described with referring to FIG. 2.

System configuration data 191, a threat list 192, an inference rule 193, an intrusion course list 194, and so on are stored in the storage unit 190. Contents of these data will be described later.

\*\*\*Description of Operations\*\*\*

Operations of the attack tree generation device 100 correspond to an attack tree generation method. A procedure of the attack tree generation method corresponds to a procedure of the attack tree generation program.

A system that is a target of a security countermeasure will be referred to as a "target system". A threat on security in the target system will be referred to as a "target threat".

An overview of the attack tree generation method will be described with referring to FIG. 3.

In step S101, the system dividing unit 110 divides the target system into a plurality of sub-systems based on the system configuration data 191.

The system configuration data 191 is data indicating a configuration of the target system.

A sub-system is a system that forms part of the target system.

In step S102, the root system selection unit 122 selects a sub-system in which a target threat occurs, from among the plurality of sub-systems based on threat data indicating a content of the target threat. The sub-system to be selected will be referred to as a "root system".

The threat data indicating the content of the target threat is included in the threat list 192.

In step S103, the root tree generation unit 131 executes an attack tree generation process on a root system to thereby generate an attack tree of the root system. The attack tree to be generated will be referred to as a "root tree".

The attack tree generation process is an arbitrary process to generate an attack tree.

The attack tree is a tree-like graph expressing an attack course taken until a threat on the system security occurs.

The root tree generation unit 131 generates the root tree as follows.

The root tree generation unit 131 generates an attack tree having a root node expressing the target threat. The attack tree to be generated is the root tree.

The root tree generation unit 131, with making a node expressing the target threat a root node, starts the attack tree generation process. Then, at a stage where an intrusion node signifying intrusion into the root system appears individually in one course or more included in the attack tree being generated, the root tree generation unit 131, with making the intrusion node appearing in the individual course a terminal node in the course, suspends the attack tree generation process. The attack tree at the time of suspension is the root tree.

A root tree 910 will be described with referring to FIG. 4.

The root tree 910 is an example of the attack tree of the target system.

The root tree 910 has a root node 911.

The root node 911 expresses a target threat.

The root tree 910 has an internal node 912.

The internal node 912 is located midway along a course extending from the root node 911 to a terminal node 913_1, and expresses an attack activity (1).

The root tree 910 has terminal nodes (913_1 to 913_3). If the terminal nodes (913_1 to 913_3) are not identified, each terminal node will be referred to as a terminal node 913.

Each terminal node 913 expresses an attack activity signifying intrusion into the target system.

The root tree 910 has logical gates (914_1, 914_2). If the logical gates (914_1, 914_2) are not identified, each logical gate will be referred to as a logical gate 914.

Each logical gate 914 is located between a parent node and a plurality of child nodes, and expresses a logical operation (OR, AND, or the like).

The logical gate 914_1 is located between a node (911) of a first layer and the two nodes (912, 913_3) of a second layer, and expresses a logical disjunction of the internal node 912 and the terminal node 913_3.

The logical gate 914_2 is located between a node (912) of the second layer and the two nodes (913_1, 913_2) of a third layer, and expresses a logical conjunction of the terminal node 913_1 and the terminal node 913_2.

Figure 3:
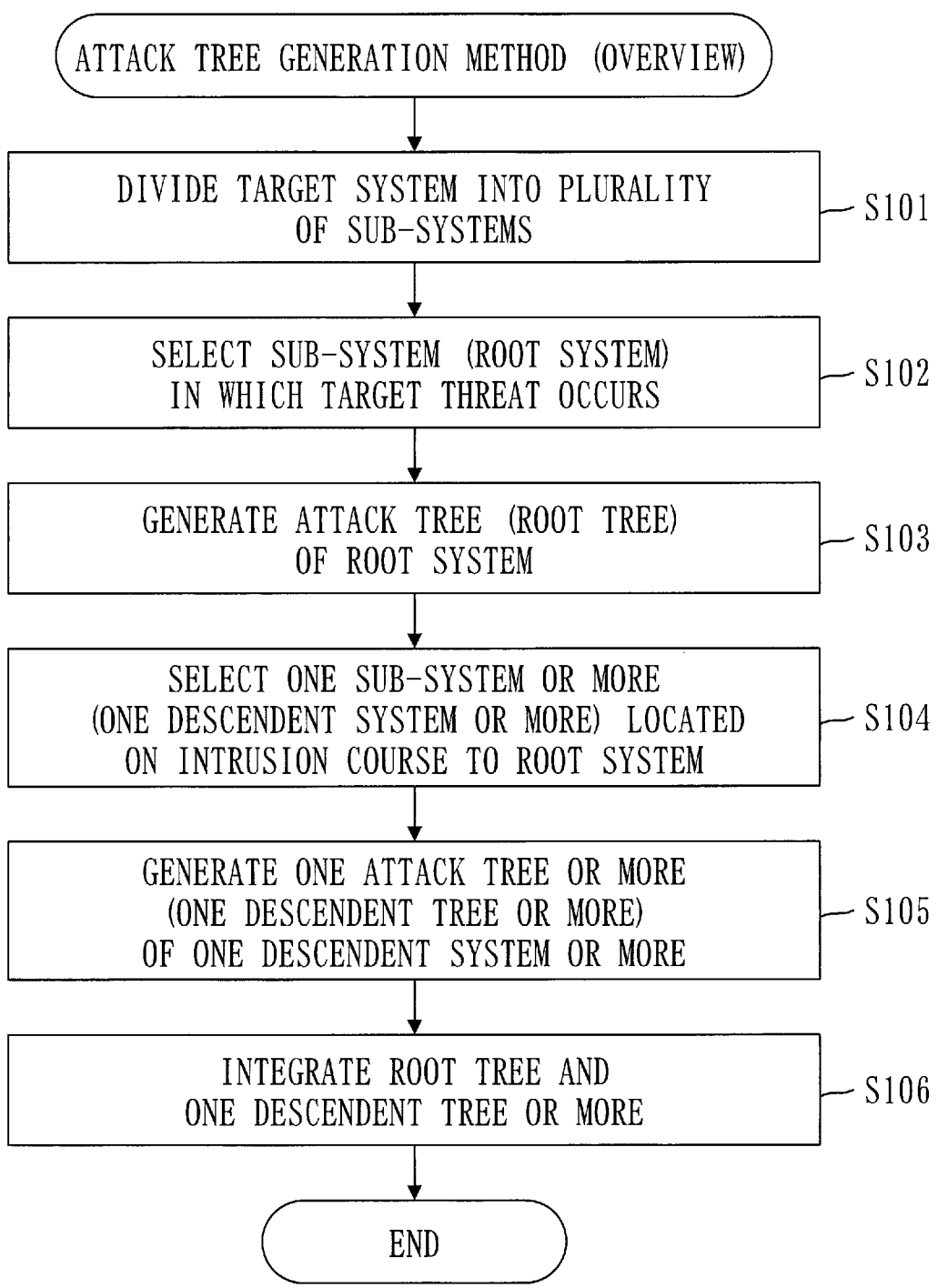
FIG. 3 is a flowchart of an attack tree generation method (overview) in Embodiment 1.

Back to FIG. 3, the description continues from step S104.

In step S104, the descendant system selection unit 132 selects one sub-system or more located on an intrusion course to the root system in the target system, from among the plurality of sub-systems based on intrusion course data. The one sub-system or more to be selected will be referred to as "one descendent system or more".

The intrusion course data is included in the intrusion course list 194.

The descendant system selection unit 132 selects the one descendent system or more as follows.

The descendant system selection unit 132 treats the root system as a parent system, and selects a sub-system located one position before the parent system on the intrusion course. The sub-system to be selected will be referred to as a "child system".

The descendant system selection unit 132 treats a last-time child system as a this-time parent system, and selects a sub-system located one position before the this-time parent system on the intrusion course. The sub-system to be selected will be referred to as "this-time child system".

In step S105, the descendant tree generation unit 133 executes the attack tree generation process on each of the one descendent system or more, to thereby generate one attack tree or more corresponding to the one descendent system or more. The one attack tree or more to be generated will be referred to as "one descendent tree or more".

The descendant tree generation unit 133 generates the one descendent tree or more as follows.

The descendant tree generation unit 133 treats a root tree as a parent tree, and with making each of one terminal node or more of the parent tree a root node, starts an attack tree generation process. Then, at a stage where an intrusion node signifying intrusion into a child system appears individually in one course or more included in the attack tree being generated, the descendant tree generation unit 133, with making the intrusion node appearing in the individual course a terminal node in the course, suspends the attack tree generation process. One attack tree or more at the time of suspension, that is, one attack tree or more corresponding to the one terminal node or more of the root tree, are one child tree or more for the root tree.

The descendant tree generation unit 133 treats each of last-time one child tree or more as a this-time parent tree, and with making each of one terminal node or more of the this-time parent tree a root node, starts an attack tree generation process. Then, at a stage where an intrusion node signifying intrusion into the this-time child system appears individually in one course or more included in the attack tree being generated, the descendant tree generation unit 133, with making the intrusion node appearing in the individual course a terminal node in the course, suspends the attack tree generation process. One attack tree or more at the time of suspension, that is, one attack tree or more corresponding to one terminal node or more of the this-time parent tree, are one child tree or more for the this-time parent tree.

Figure 5:
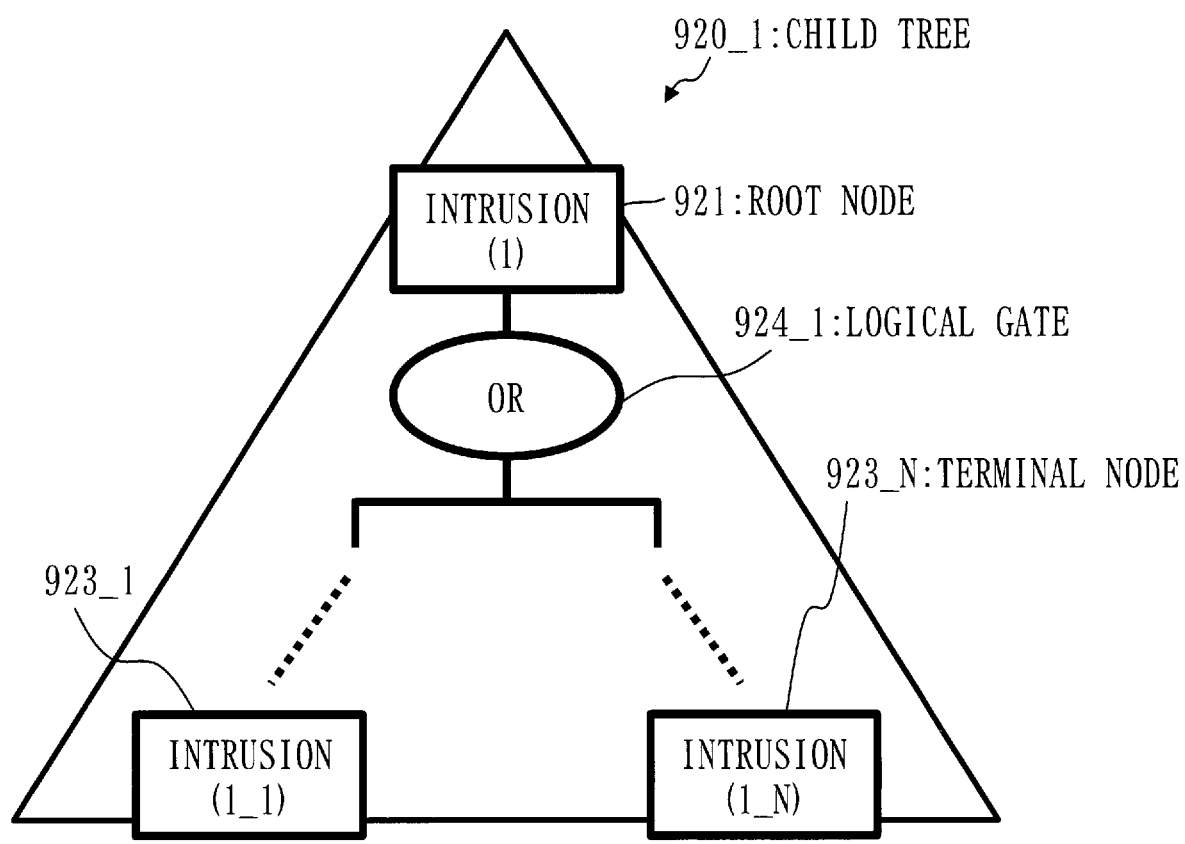
FIG. 5 is a diagram illustrating a child tree 920_1 in Embodiment 1.

A child tree 920_1 will be described with referring to FIG. 5.

The child tree 920_1 is an example of an attack tree of a child system (1).

The child system (1) is a sub-system located one position before the target system on the intrusion root to the target system. That is, the child system (1) is a child system for the target system (parent system).

The child tree 920_1 corresponds to a child tree for the root tree 910 (parent tree).

The child tree 920_1 has a root node 921.

Figure 4:
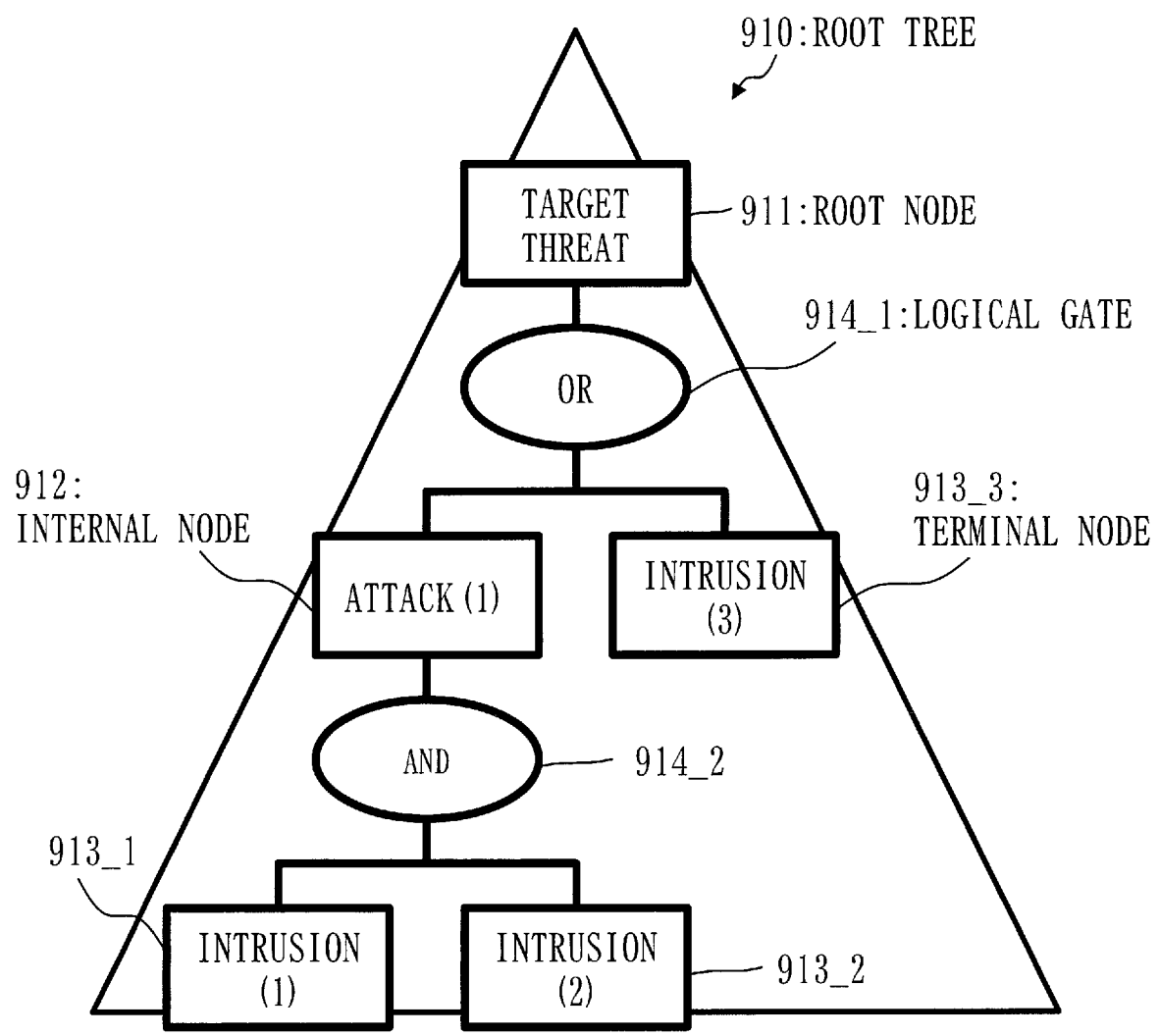
FIG. 4 is a diagram illustrating a root tree 910 in Embodiment 1.

The root node 921 expresses the same attack activity as that of the terminal node 913_1 of the root tree 910 (see FIG. 4).

The child tree 920_1 has one logical gate (924_1) or more, one internal node or more, and one terminal node or more (923_1 to 923_N), just as the root tree 910 (see FIG. 4) does.

If the terminal nodes (923_1 to 923_N) are not identified, each terminal node will be referred to as a terminal node 923.

Each terminal node 923 expresses an attack activity signifying intrusion into the child system (1).

A child tree 920_2 (not shown) and a child tree 920_3 (not shown) are generated just as the child tree 920_1 is.

Each child tree (920_2, 920_3) is an attack tree of the child system (1).

Each child tree (920_2, 920_3) corresponds to a child tree for the root tree 910 (parent tree).

In the child tree 920_2, a root node expresses the same attack activity as that of a terminal node 913_2 of the root tree 910 (see FIG. 4).

In the child tree 920_3, a root node expresses the same attack activity as that of a terminal node 913_3 of the root tree 910 (see FIG. 4).

Furthermore, a plurality of grandchild trees for the plurality of terminal nodes of the three child trees (920_1 to 920_3) are generated.

Each grandchild tree is an attack tree of a child system (2). The child system (2) is a sub-system located one position before the child system (1) in an intrusion course to the target system. That is, the child system (2) is a child system for the child system (1).

Each grandchild tree corresponds to a child tree for a child tree (920_1 to 920_3).

In each grandchild tree, a root node expresses the same attack activity as that of the terminal node of the child tree (920_1 to 920_3).

In each grandchild tree, a terminal node expresses an attack activity signifying intrusion into the child system (2).

In the following, a last-time child system will be treated as a this-time parent system, and a last-time child tree will be treated as a this-time parent tree. Generation of a descendent tree is repeated until the last-time child system becomes a head sub-system in an intrusion course to the target system.

Back to FIG. 3, the description continues from step S105.

The descendant tree generation unit 133 may divide one terminal node or more of the (this-time) parent tree into one terminal node group or more. In this case, the descendant tree generation unit 133, with making each of the one terminal node group or more of the (this-time) parent tree a root node, generates one child tree or more for the (this-time) parent tree.

For example, the descendant tree generation unit 133 operates as follows.

Figure 6:
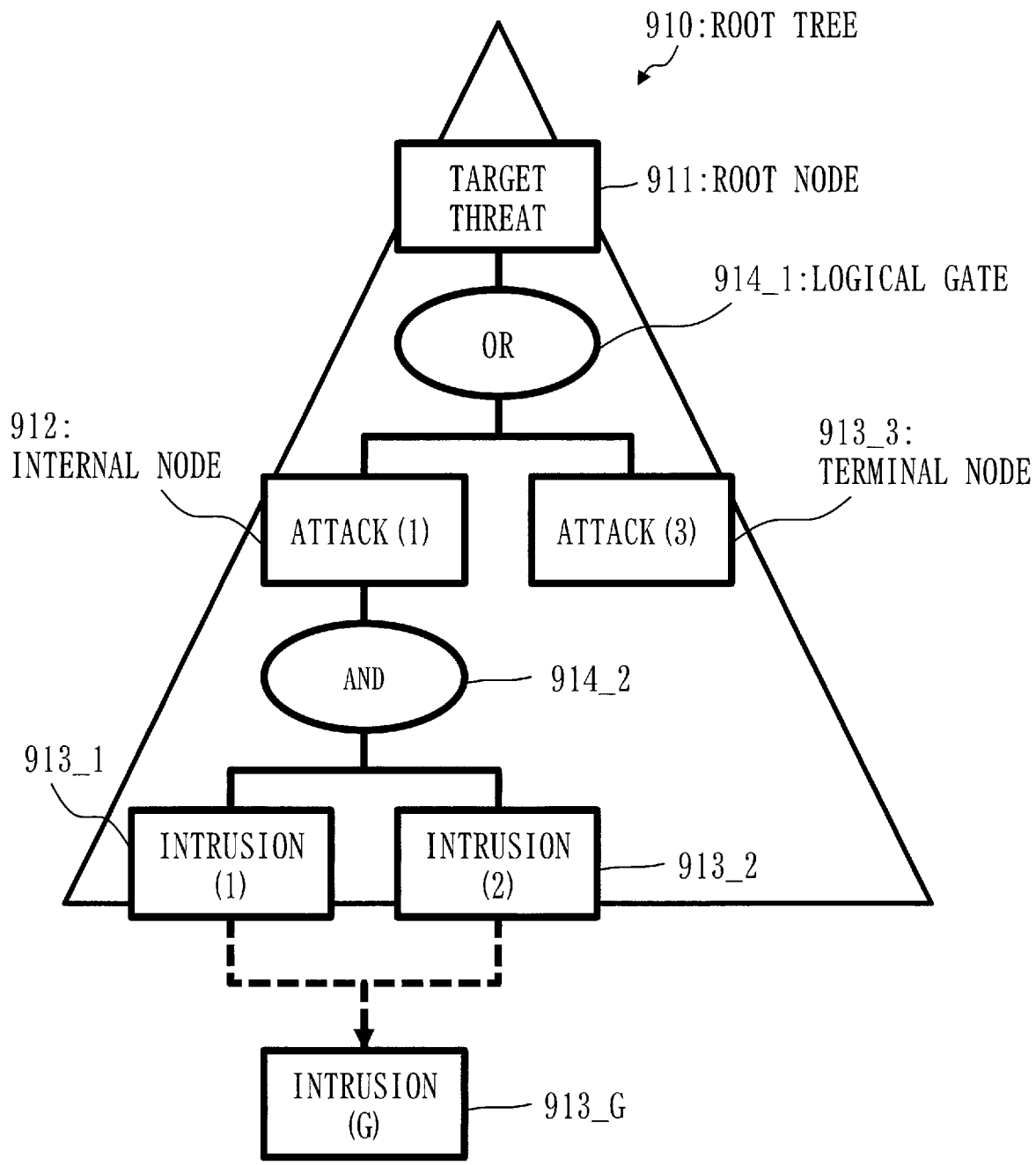
FIG. 6 is a diagram illustrating another example of the root tree 910 in Embodiment 1.

As illustrated in FIG. 6, the descendant tree generation unit 133 groups the terminal node 913_1 and the terminal node 913_2 together to generate a terminal node 913_G.

Then, the descendant tree generation unit 133 generates a child tree having a root node expressing the same attack activity as that of the terminal node 913_G.

Back to FIG. 3, step S106 will be described.

In step S106, the sub-attack tree integration unit 140 integrates the root tree and one descendent tree or more.

Thus, an attack tree of the target system is generated.

Figure 7:
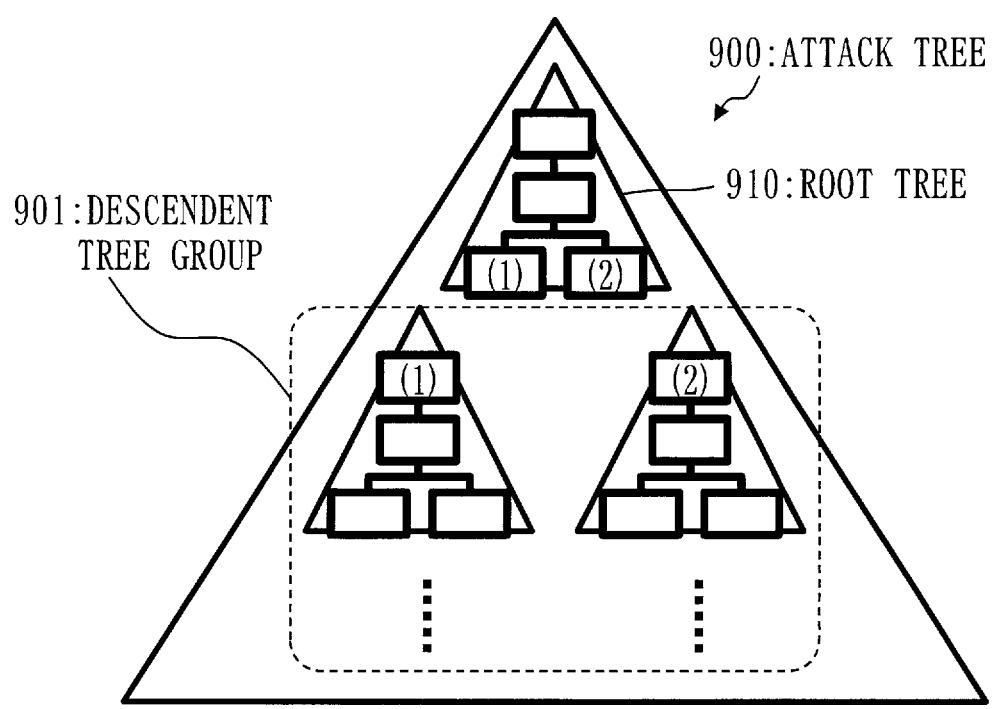
FIG. 7 is a diagram illustrating an attack tree 900 in Embodiment 1.

An attack tree 900 will be described with referring to FIG. 7.

The attack tree 900 is an example of the attack tree of the target system.

The attack tree 900 includes a root tree 910 and a descendent tree group 901.

The descendent tree group 901 consists of one descendent tree or more.

A root node of each descendent tree is the same as that of a terminal node of the parent node.

When there are a plurality of intrusion courses to the root system in the target system, the attack tree generation device 100 operates as follows.

The descendant system selection unit 132 selects a descendent system group in units of intrusion courses. Hence, a plurality of descendent system groups corresponding to the plurality of intrusion courses are selected. A descendent system group consists of one descendent system or more.

The descendant tree generation unit 133 generates a descendent tree group in units of descendent system groups. Hence, a plurality of descendent tree groups corresponding to the plurality of intrusion courses are generated.

The sub-attack tree integration unit 140 searches the plurality of descendent tree groups corresponding to the plurality of intrusion courses to thereby find brother trees. The brother trees are a plurality of child trees each having the same root node as that of a common terminal node of a common parent tree.

Then, the sub-attack tree integration unit 140 connects the individual root nodes of the brother trees to the common terminal node via a logical disjunction gate. That is, the sub-attack tree integration unit 140 connects the logical disjunction gate to the common terminal node of the common parent tree, and connects the individual root nodes of the brother trees to the logical disjunction gate. The logical disjunction gate expresses a logical disjunction.

Figure 8:
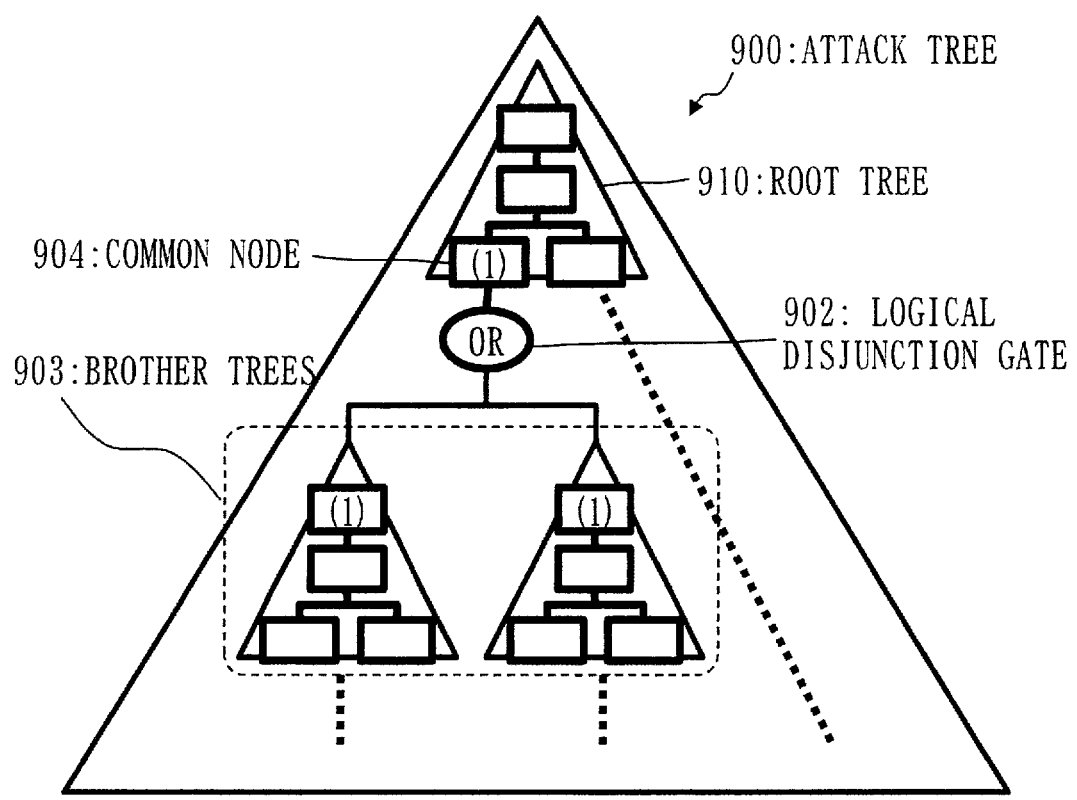
FIG. 8 is a diagram illustrating another example of the attack tree 900 in Embodiment 1.

The attack tree 900 of a case where there are a plurality of intrusion courses to the target system will be described with referring to FIG. 8.

Each brother tree 903 has the same root node as that of a common node 904.

The common node 904 is a common terminal node of a common parent tree (root tree 910).

The individual root nodes of the brother trees 903 are connected to the common node 904 via a logical disjunction gate 902.

The attack tree generation method will be described in detail with referring to FIG. 9.

In step S110, the system dividing unit 110 divides the target system into a plurality of sub-systems based on the system configuration data 191.

The system dividing unit 110 divides the target system into the plurality of sub-systems as follows.

The system configuration data 191 indicates a configuration of the target system. The configuration of the target system is expressed by a logical formula suited to the inference rule 193. Alternatively, the configuration of the target system may be expressed by information other than a logical formula. In that case, the system dividing unit 110 converts configuration information of the target system into a logical formula. For example, the system dividing unit 110 converts the configuration information of the target system into a logical formula by an attack tree automatic generation tool disclosed in Non-Patent Literature 2 or Non-Patent Literature 3.

The system dividing unit 110 divides the system configuration data 191 into a plurality of pieces of sub-system configuration data. The system configuration data 191 corresponds to the target system, and the plurality of pieces of sub-system configuration data correspond to the plurality of sub-systems. Each sub-system configuration data indicates the configuration of the sub-system by a logical formula.

Specifically, the system dividing unit 110 divides the logical formula expressed by the system configuration data 191 into a plurality of logical formulas according to a dividing criterion. The plurality of logical formulas correspond to the plurality of pieces of sub-system configuration data. For example, the dividing criterion is designated by a user.

The dividing criterion is an arbitrary criterion. Specific examples of the dividing criterion include division in units of sub-nets, division at a network boundary (for example, a firewall), and grouping based on a device type. The device type is, for example, a type of the OS. It is assumed that the same OS is installed in a plurality of user terminals connected to the same sub-net.

Alternatively, the user may decide division of the target system based on the dividing criterion and may instruct the attack tree generation device 100 to divide the target system. In this case, the system dividing unit 110 divides the target system into a plurality of sub-systems according to the instruction of the user.

The larger a dividing number (a number of sub-systems), the larger an amount of calculation for generating the attack tree of the target system. Therefore, the dividing number should not be increased excessively.

In step S121, the intrusion data acquisition unit 121 acquires target threat data from the threat list 192.

The threat list 192 includes a plurality of pieces of threat data. Each threat data indicates a content of a threat on the security in the target system. The content of the threat is expressed by a logical formula suited to the inference rule 193.

The target threat data is threat data about the target threat.

For example, the intrusion data acquisition unit 121 acquires head threat data from the threat list 192. The threat data to be acquired is the target threat data.

Alternatively, the intrusion data acquisition unit 121 may acquire the target threat data by another method. For example, the user selects the target threat data from among the plurality of pieces of threat data included in the threat list 192, and designates the target threat data to the attack tree generation device 100. Then, the intrusion data acquisition unit 121 acquires the designated target threat data from the threat list 192.

In step S122, the root system selection unit 122 selects a root system from among the plurality of sub-systems based on the target threat data.

The root system is a sub-system in which the target threat occurs.

The root system selection unit 122 selects the root system as follows.

The target threat data indicates a system element in which the target threat occurs. The system element is, for example, a device (computer), an application program installed in the device, or another information resource.

First, the root system selection unit 122 refers to the target threat data to identify the system element in which the target threat occurs. The system element to be identified will be called a target element.

Then, the root system selection unit 122 refers to the system configuration data 191 to identify a sub-net to which the target element is connected. A sub-system corresponding to the sub-net to be identified is the root system.

In step S123, the intrusion course list generation unit 123 makes a list of intrusion courses of a start point system to the root system. The intrusion course list 194 is thus generated.

The intrusion course list 194 includes one piece of intrusion course data or more. When there are two intrusion courses, the intrusion course list 194 includes two pieces of intrusion course data.

A start point system is a sub-system serving as a start point of an attack in the target system. A terminal to serve as the start point of the attack will be referred to as a start point terminal. When the start point terminal is an element in the target system, a start point system is a sub-system corresponding to a sub-net to which the start point terminal is connected, that is, a start point system is a sub-system to which the start point terminal belongs. When the start point terminal is an element outside the target system, the start point system is a sub-system capable of communicating with an outside of the target system, that is, a start point system is a sub-system connected to an external network.

In step S130, the sub-attack tree generation unit 130 generates a sub-attack tree group in units of intrusion courses indicated in the intrusion course list 194.

The sub-attack tree group consists of one sub-attack tree or more.

A sub-attack tree is an attack tree of the sub-system.

Figure 10:
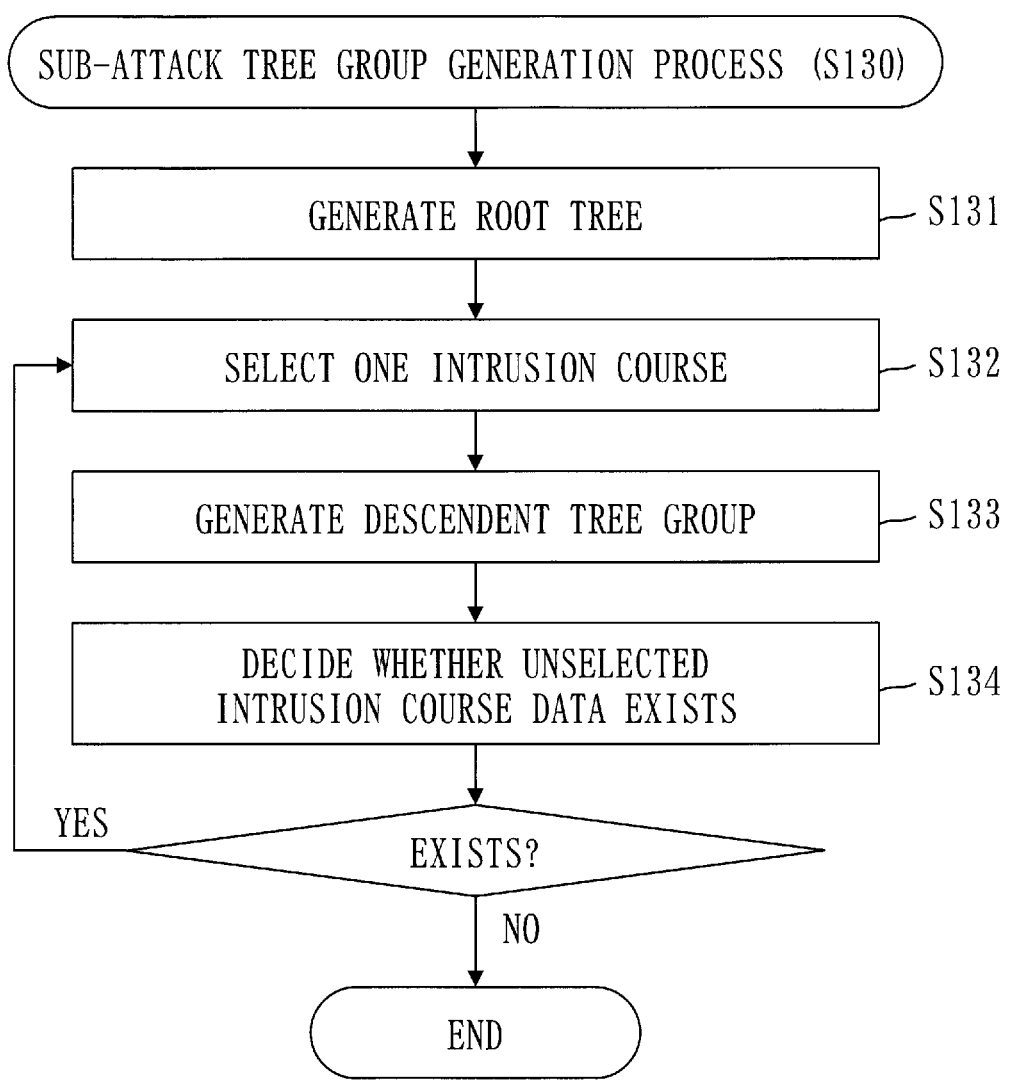
FIG. 10 is a flowchart of a sub-attack tree group generation process (S130) in Embodiment 1.

A procedure of a sub-attack tree group generation process (S130) will be described with referring to FIG. 10.

In step S131, the root tree generation unit 131 generates a root tree using the inference rule 193.

The inference rule 193 is an inference rule for generating an attack tree of the target system. The inference rule 193 is a logical rule concerning various types of threats to the security and concerning execution orders of various types of cyber attack techniques. The inference rule 193 is defined to be able to determine conditions under which the various types of threats occur and conditions under which the various types of cyber attack techniques are established. As far as a rule corresponding to the target system can be specified, the inference rule 193 can have any inference system, and the inference rule 193 can have any data format. Also, any number of rules can be defined in the inference rule 193.

Specifically, the root tree generation unit 131 takes as input the root system configuration data, the target threat data, and the inference rule 193, and executes an attack tree automatic generation tool.

The root system configuration data is sub-system configuration data indicating a configuration of the root system.

The attack tree automatic generation tool to be used may be a conventional tool. For example, the attack tree automatic generation tool disclosed in Non-Patent Literature 2 or Non-Patent Literature 3 can be used.

Note that at a stage where a root system intrusion node appears in the individual course of the attack tree being generated, the root tree generation unit 131 suspends execution of the attack tree automatic generation tool. The root system intrusion node is a node signifying intrusion into the root system.

A root tree is thus obtained. The root tree generation unit 131 stores the root tree as data in the storage unit 190.

In step S132, the descendant system selection unit 132 selects one piece of unselected intrusion course data from the intrusion course list 194.

The intrusion course data to be selected will be referred to as selection course data, and an intrusion course indicated by the selection course data will be referred to as a selection course.

In step S133, the descendant tree generation unit 133 generates a descendent tree group for the selection course. The descendent tree group consists of one descendent tree or more.

A procedure of a descendent tree group generation process (S133) will be described later.

In step S134, the descendant system selection unit 132 decides whether an intrusion course not selected (unselected intrusion course) in step S132 exists.

If an unselected intrusion course exists, the processing proceeds to step S132.

If an unselected intrusion course does not exist, the sub-attack tree group generation process (S130) ends.

The processes of step S132 to step S134 may be implemented by parallel processing. That is, a plurality of descendent tree groups for the plurality of intrusion courses may be generated simultaneously by parallel processing.

Figure 11:
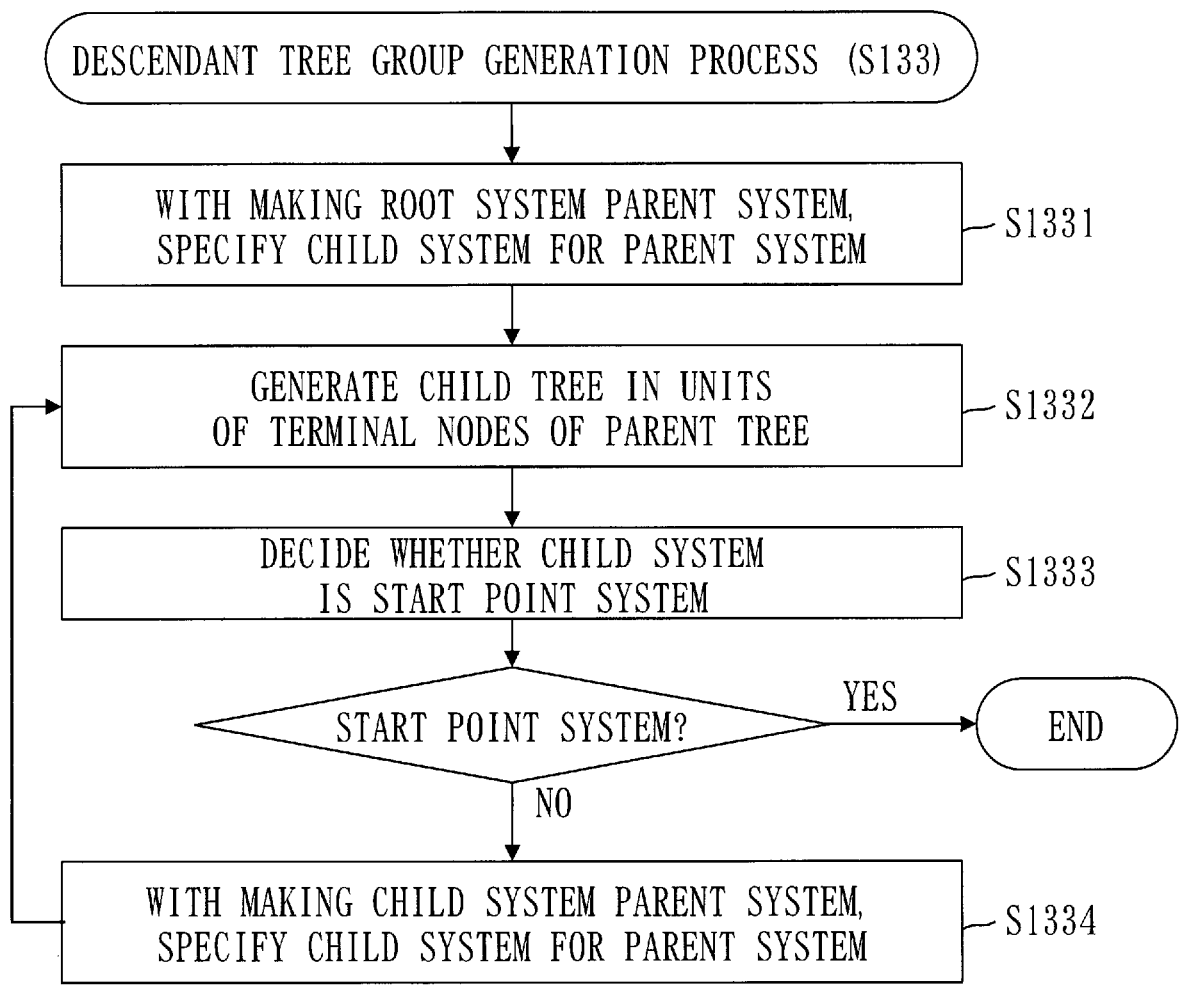
FIG. 11 is a flowchart of a descendent tree group generation process (S133) in Embodiment 1.

A procedure of the descendent tree group generation process (S133) will be described with referring to FIG. 11.

In step S1331, the descendant system selection unit 132, with making a root system a parent system, specifies a child system for the parent system.

The child system is a sub-system located one position before the parent system in the selection course.

In step S1332, the descendent tree generation unit 133 generates a child tree in units of terminal nodes of the parent tree, using the inference rule 193.

The parent tree is an attack tree of the parent system.

The child tree is an attack tree of the child system.

Specifically, the descendent tree generation unit 133 takes as input child system configuration data and the inference rule 193, and executes the attack tree automatic generation tool.

The child system configuration data is sub-system configuration data indicating a configuration of the child system.

The attack tree automatic generation tool to be used is the same as the tool used in step S131.

Note that at a stage where a child system intrusion node appears in the individual course of the attack tree being generated, the descendent tree generation unit 133 suspends execution of the attack tree automatic generation tool. The child system intrusion node is a node signifying intrusion into the child system.

A child tree is thus obtained. The descendant tree generation unit 133 stores the child tree as data in the storage unit 190.

Step S1332 may be implemented by parallel processing. That is, a plurality of child trees for a plurality of terminal nodes of the parent tree may be generated simultaneously by parallel processing.

In step S1333, the descendant system selection unit 132 decides whether the child system is a start point system.

A start point system is a head sub-system in a selection course.

If the child system is a start point system, the descendent tree group generation process (S133) ends.

If the child system is not a start point system, the processing proceeds to step S1334.

In step S1334, the descendant system selection unit 132, with making the child system a parent system, specifies a child system for the parent system.

After step S1334, the processing proceeds to step S1332.

Figure 9:
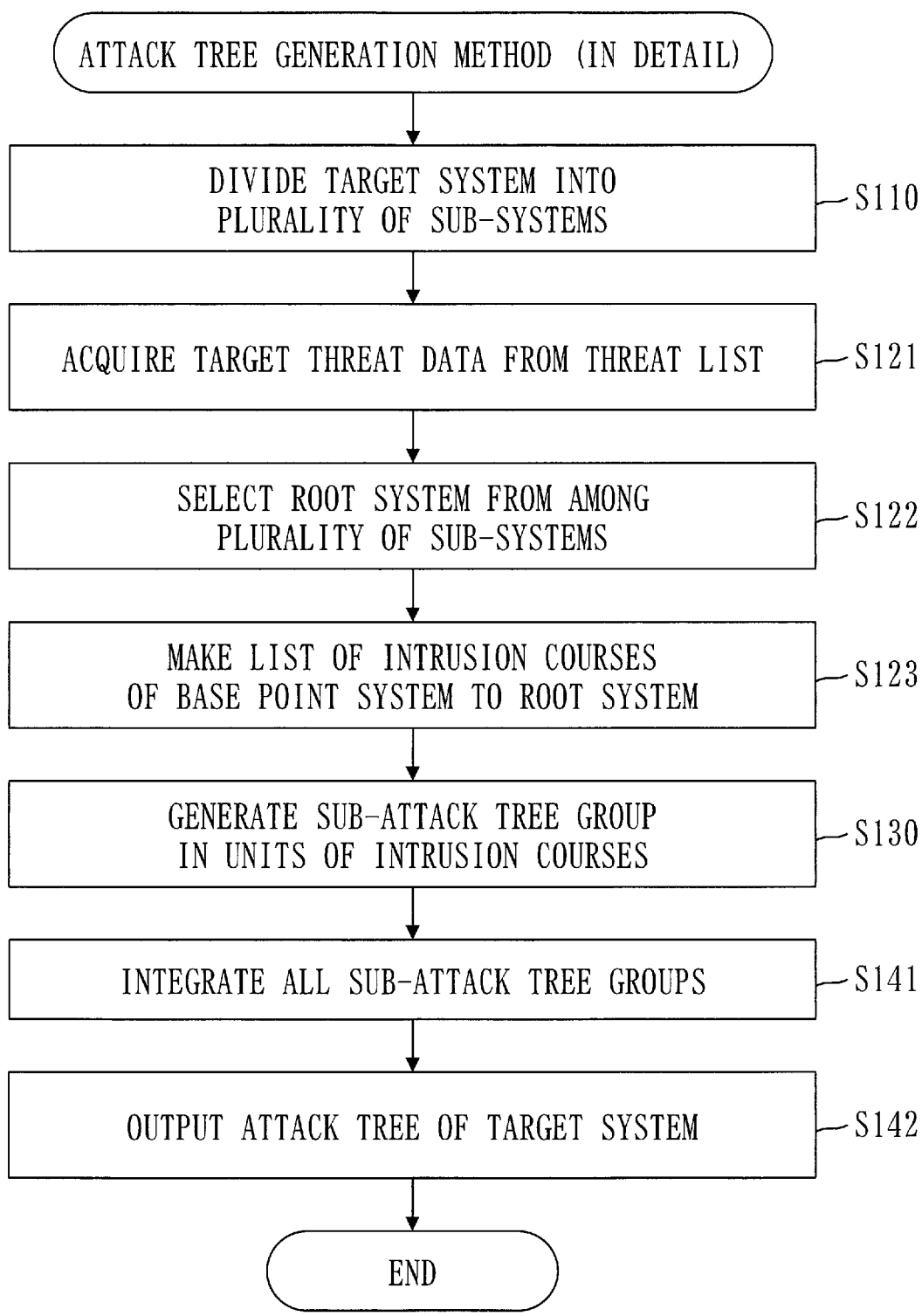
FIG. 9 is a flowchart of an attack tree generation method (in detail) in Embodiment 1.

Back to FIG. 9, the description continues from step S141.

In step S141, the sub-attack tree integration unit 140 integrates all sub-attack tree groups.

An attack tree of the target system is thus obtained. The sub-attack tree integration unit 140 stores the attack tree of the target system as data in the storage unit 190.

Note that the sub-attack tree integration unit 140 operates as follows.

The sub-attack tree integration unit 140 searches all the sub-attack tree groups to thereby find brother trees. The brother trees are a plurality of child trees each having the same root node as that of a common terminal node of a common parent tree.

Then, the sub-attack tree integration unit 140 connects the individual root nodes of the brother trees to the common terminal node via a logical disjunction gate.

In step S142, the sub-attack tree integration unit 140 outputs the attack tree of the target system.

For example, the sub-attack tree integration unit 140 displays the attack tree of the target system to the display.

Effect of Embodiment 1

An attack tree automatic generation tool of a logical inference type has a problem that an amount of calculation increases on the order of polynomials for a scale of a system.

In Embodiment 1, a plurality of sub-attack trees corresponding to a plurality of sub-systems are generated, and after that the plurality of sub-attack trees are coupled, thereby generating the attack tree of the target system.

As the scale of the sub-system is smaller than the scale of the target system, an amount of calculation for generating a sub-attack tree does not increase. As a result, the amount of calculation necessary for generating the attack tree of the target system can be reduced.

Embodiment 2

Figure 12:
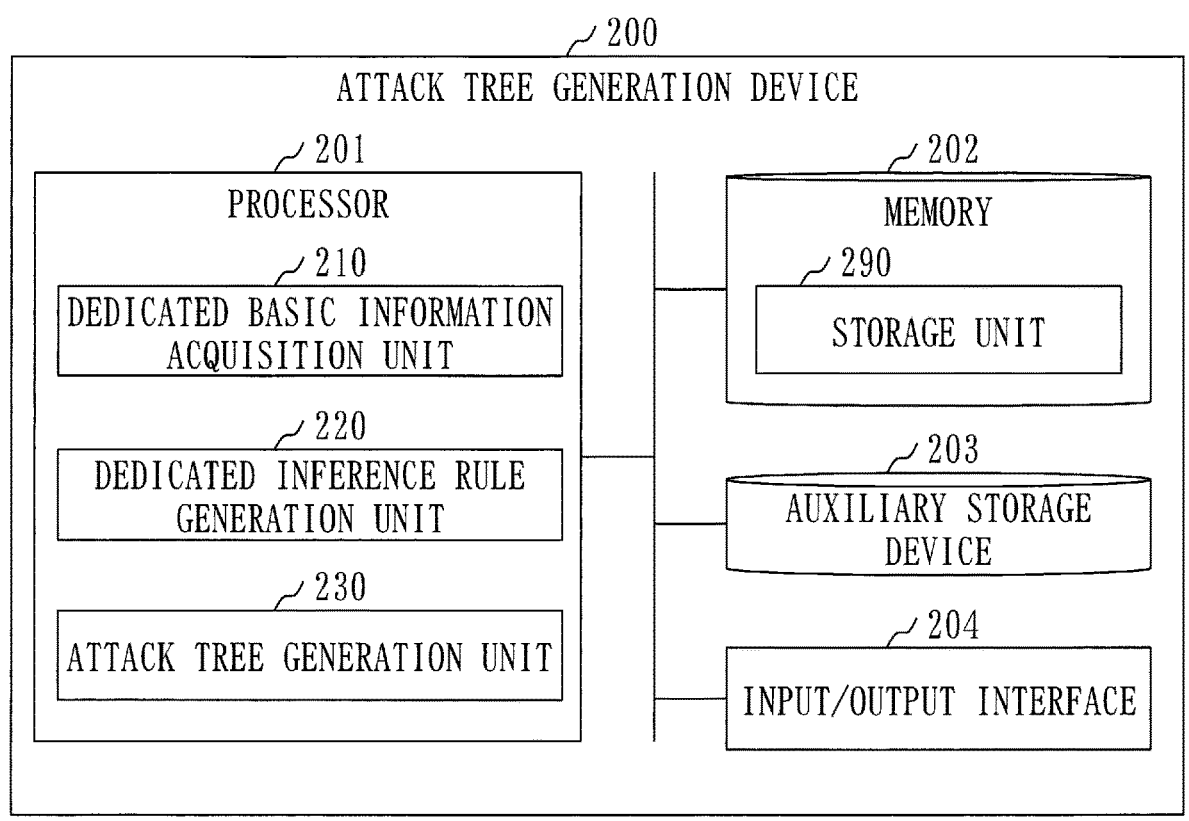
FIG. 12 is a configuration diagram of an attack tree generation device 200 in Embodiment 2.
Figure 13:
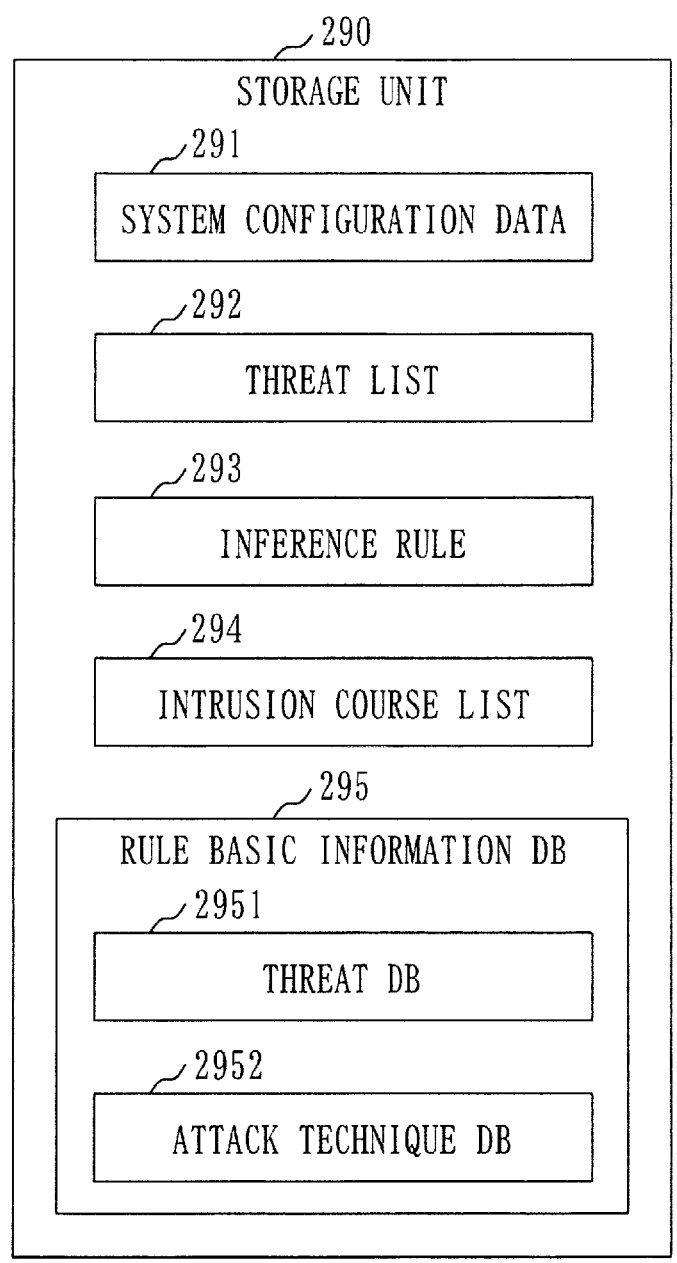
FIG. 13 is a configuration diagram of a storage unit 290 in Embodiment 2.
Figure 14:
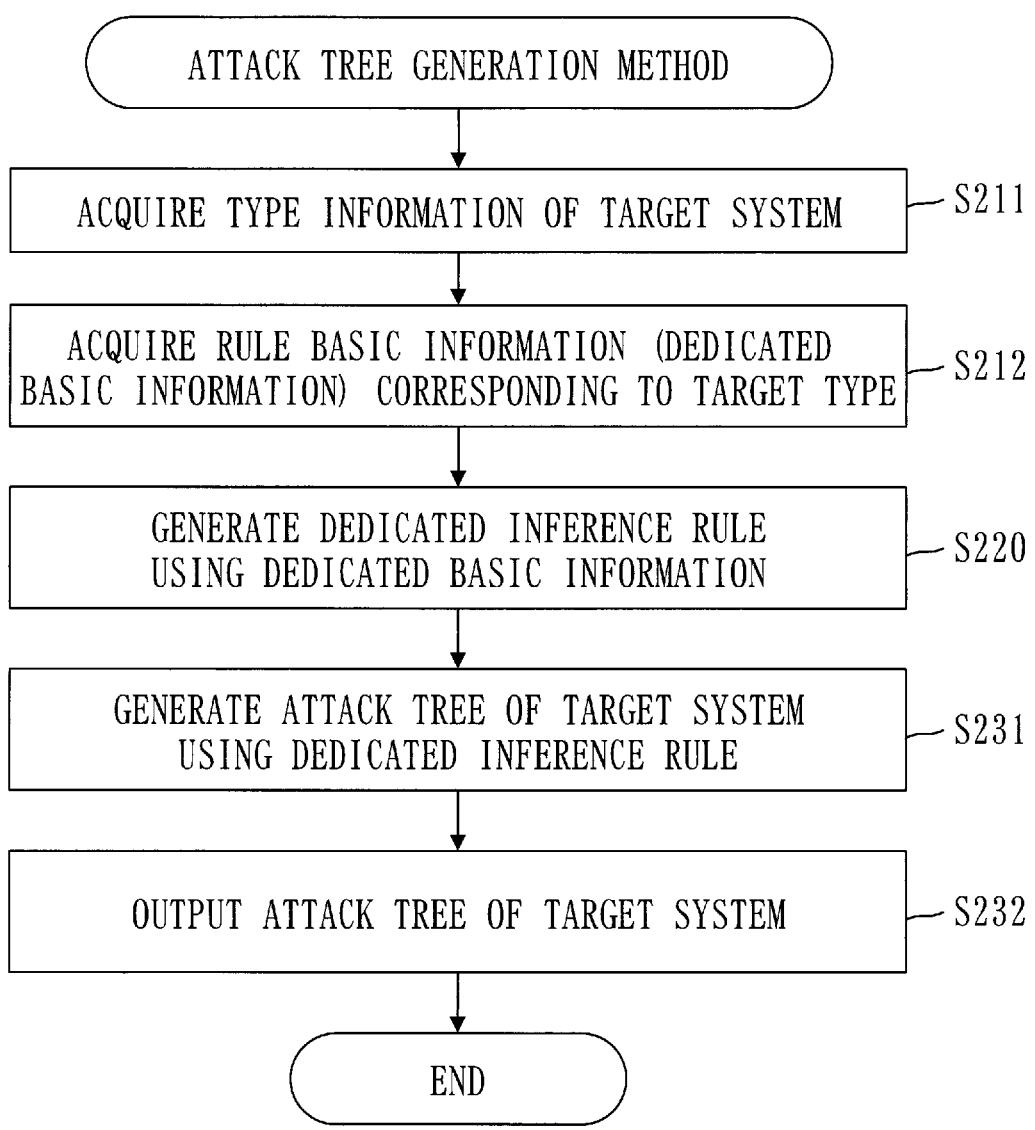
FIG. 14 is a flowchart of an attack tree generation method in Embodiment 2.

An attack tree generation device 200 will be described with referring to FIGS. 12 to 14 mainly regarding its difference from Embodiment 1.

The attack tree generation device 200 generates a dedicated inference rule of a target system, and generates an attack tree of the target system using the dedicated inference rule.

*Description of Configurations*

A configuration of the attack tree generation device 200 will be described with referring to FIG. 12.

The attack tree generation device 200 is a computer provided with hardware devices such as a processor 201, a memory 202, an auxiliary storage device 203, and an input/output interface 204. These hardware devices are connected to each other via signal lines.

The processor 201 is an IC that performs computation processing, and controls the other hardware devices. The processor 201 is, for example, a CPU, a DSP, or a GPU.

The memory 202 is a volatile storage device. The memory 202 is called a main storage device or a main memory as well. The memory 202 is, for example, a RAM. Data stored in the memory 202 is saved in the auxiliary storage device 203 as necessary.

The auxiliary storage device 203 is a nonvolatile storage device. The auxiliary storage device 203 is, for example, a ROM, an HDD, or a flash memory. Data stored in the auxiliary storage device 203 is loaded into the memory 202 as necessary.

The input/output interface 204 is a port to which an input device and an output device are connected. For example, the input/output interface 204 is a USB terminal, the input device includes a keyboard and a mouse, and the output device is a display.

The attack tree generation device 200 is provided with elements such as a dedicated basic information acquisition unit 210, a dedicated inference rule generation unit 220, and an attack tree generation unit 230. These elements are implemented by software.

An attack tree generation program to cause the computer to function as the dedicated basic information acquisition unit 210, the dedicated inference rule generation unit 220, and the attack tree generation unit 230 is stored in the auxiliary storage device 203. The attack tree generation program is loaded into the memory 202 and executed by the processor 201.

Furthermore, an OS is stored in the auxiliary storage device 203. At least part of the OS is loaded into the memory 202 and executed by the processor 201.

That is, the processor 201 executes the attack tree generation program while executing the OS.

Input/output data of the attack tree generation program is stored in a storage unit 290.

The memory 202 functions as the storage unit 290. Alternatively, a storage device such as the auxiliary storage device 203, a register in the processor 201, and a cache memory in the processor 201 may function as the storage unit 290 in place of the memory 202 or together with the memory 202.

The attack tree generation device 200 may be provided with a plurality of processors that substitute for the processor 201. The plurality of processors share a role of the processor 201.

The attack tree generation program can be computer readably recorded (stored) in a nonvolatile recording medium such as an optical disk and a flash memory.

A configuration of the storage unit 290 will be described with referring to FIG. 13.

System configuration data 291, a threat list 292, an inference rule 293, an intrusion course list 294, a rule basic information database 295, and so on are stored in the storage unit 290.

The system configuration data 291, the threat list 292, the inference rule 293, and the intrusion course list 294 are respectively the same as the data (191, 192, 193, 194) in Embodiment 1.

The rule basic information database 295 includes a threat database 2951 and an attack technique database 2952.

*Description of Operations*

An attack tree generation method will be described with referring to FIG. 14.

In step S211, the dedicated basic information acquisition unit 210 acquires type information of the target system from the system configuration data 291.

The system configuration data 291 includes the type information of the target system.

The type information of the target system indicates a type of the target system.

The type of the target system is a type of a system element included in the target system.

The system element is, for example, a device (computer), an OS stored in the device, an application program installed in the device, or another information resource.

For example, the system type is a device type, an OS type, an application type, or an information resource type.

In step S212, the dedicated basic information acquisition unit 210 acquires rule basic information corresponding to the type of the target system from the rule basic information database 295.

The rule basic information to be acquired will be referred to as "dedicated basic information".

In the rule basic information database 295, a plurality of system types and a plurality of pieces of rule basic information are associated with each other.

Rule basic information is information for generating an inference rule.

Specifically, the rule basic information database 295 includes the threat database 2951 and the attack technique database 2952.

Various types of threat templates are registered with the threat database 2951. A type tag is attached to each threat template. The threat template is an instance of threat data to be registered with the threat list. A precondition for causing a threat is defined in the threat template. The precondition is defined by a logical formula or an expression that can be converted into a logical formula. Target threat data is generated by setting information of the system element (such as device name and information resource name) of the target system with the threat template. The target threat data is generated by, for example, the dedicated basic information acquisition unit 210 or the attack tree generation unit 230.

Methods of cyber attacks are registered with the attack technique database 2952. A type tag is attached to each attack method. The attack method includes a precondition for using the method and an effect (attack effect) caused by the attack. The precondition and the attack effect are defined by a logical formula or an expression that can be converted into a logical formula.

In step S220, the dedicated inference rule generation unit 220 executes an inference rule generation process using only the dedicated basic information among a plurality of pieces of rule basic information. A dedicated inference rule of the target system is thus generated. The dedicated inference rule to be generated is the inference rule 293.

The inference rule generation process is an arbitrary process for generating the inference rule. For example, a scheme disclosed in Patent Literature 1 can be employed. Patent Literature 1 discloses the scheme for automatically generating an inference rule for deriving an attack scenario.

With this scheme, an inference rule is generated automatically with using definition of an attack method (a precondition and an attack effect).

In the inference rule generation process, the dedicated inference rule generation unit 220 operates as follows. First, the dedicated inference rule generation unit 220 specifies a combination of attack techniques each having an attack effect that satisfies the precondition of the threat (or the attack technique). Subsequently, the dedicated inference rule generation unit 220 specifies an execution order of the threat (or of the attack technique) based on the specified combination. Then, the dedicated inference rule generation unit 220 generates a dedicated inference rule based on the specified execution order.

In step S231, the attack tree generation unit 230 executes an attack tree generation process using the dedicated inference rule. An attack tree of the target system is thus generated.

The attack tree generation process is an arbitrary process for generating an attack tree (the same as in Embodiment 1).

In step S232, the attack tree generation unit 230 outputs the attack tree of the target system.

For example, the attack tree generation unit 230 displays the attack tree of the target system to the display.

Effect of Embodiment 2

An attack tree automatic generation tool of a logical inference type has a problem that an amount of calculation increases on the order of polynomials for a scale of a system.

In Embodiment 2, a dedicated inference rule that is limitedly a rule concerning the type of the target system is generated, and after that an attack tree of the target system is generated with using the dedicated inference rule.

As the dedicated inference rule that is limitedly the rule concerning the type of the target system is used, an amount of calculation necessary for generating the attack tree of the target system can be reduced.

Embodiment 3

Figure 15:
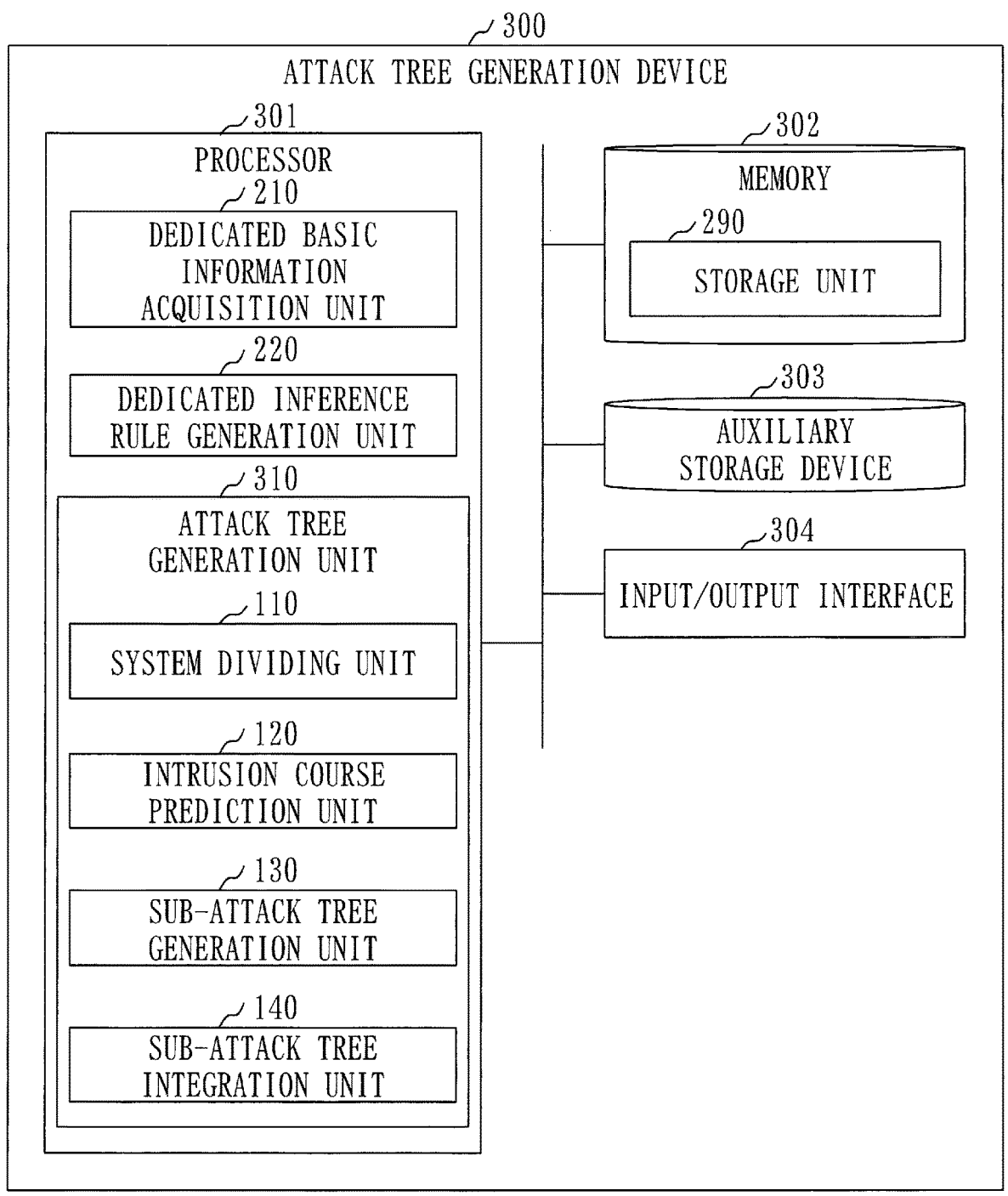
FIG. 15 is a configuration diagram of an attack tree generation device 300 in Embodiment 3.
Figure 16:
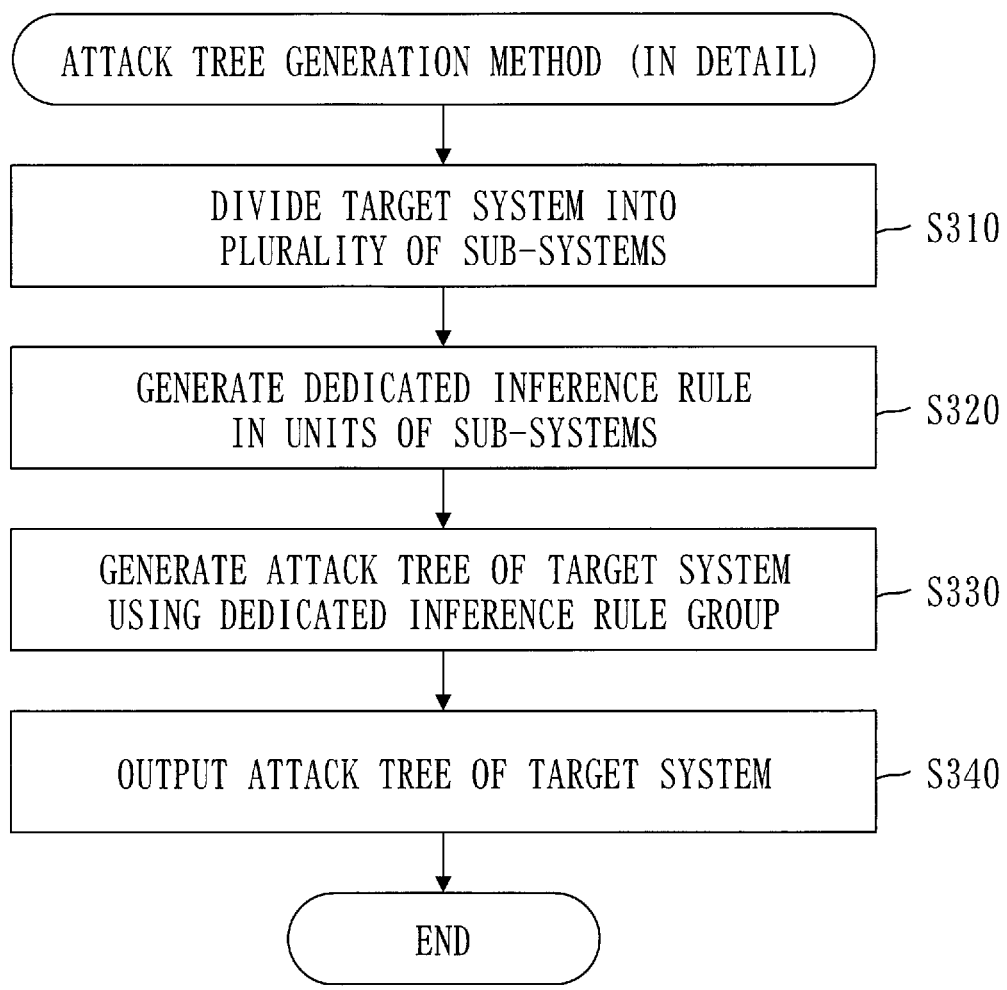
FIG. 16 is a flowchart of an attack tree generation method in Embodiment 3.

An attack tree generation device 300 will be described with referring to FIGS. 15 and 16 mainly regarding its difference from Embodiment 1.

The attack tree generation device 300 is a combination of the attack tree generation device 100 (Embodiment 1) and the attack tree generation device 200 (Embodiment 2).

\*\*\*Description of Configurations\*\*\*

A configuration of the attack tree generation device 300 will be described with referring to FIG. 15.

The attack tree generation device 300 is a computer provided with hardware devices such as a processor 301, a memory 302, an auxiliary storage device 303, and an input/output interface 304. These hardware devices are connected to each other via signal lines.

The processor 301 is an IC that performs computation processing, and controls the other hardware devices. The processor 301 is, for example, a CPU, a DSP, or a GPU.

The memory 302 is a volatile storage device. The memory 302 is called a main memory device or a main memory as well. The memory 302 is, for example, a RAM. Data stored in the memory 302 is saved in the auxiliary storage device 303 as necessary.

The auxiliary storage device 303 is a nonvolatile storage device. The auxiliary storage device 303 is, for example, a ROM, an HDD, or a flash memory. Data stored in the auxiliary storage device 303 is loaded into the memory 302 as necessary.

The input/output interface 304 is a port to which an input device and an output device are connected. For example, the input/output interface 304 is a USB terminal, the input device includes a keyboard and a mouse, and the output device is a display.

The attack tree generation device 300 is provided with elements such as a dedicated basic information acquisition unit 210, a dedicated inference rule generation unit 220, and an attack tree generation unit 310. These elements are implemented by software.

The attack tree generation unit 310 is provided with a system dividing unit 110, an intrusion course prediction unit 120, a sub-attack tree generation unit 130, and a sub-attack tree integration unit 140.

The system dividing unit 110, the intrusion course prediction unit 120, the sub-attack tree generation unit 130, and the sub-attack tree integration unit 140 are individually elements in Embodiment 1.

The dedicated basic information acquisition unit 210 and the dedicated inference rule generation unit 220 are individually elements in Embodiment 2.

An attack tree generation program to cause the computer to function as the dedicated basic information acquisition unit 210, the dedicated inference rule generation unit 220, and the attack tree generation unit 310 is stored in the auxiliary storage device 303. The attack tree generation program is loaded into the memory 302 and executed by the processor 301.

Furthermore, an OS is stored in the auxiliary storage device 303. At least part of the OS is loaded into the memory 302 and executed by the processor 301.

That is, the processor 301 executes the attack tree generation program while executing the OS.

Input/output data of the attack tree generation program is stored in a storage unit 290. The storage unit 290 is an element in Embodiment 2.

The memory 302 functions as the storage unit 290. Alternatively, a storage device such as the auxiliary storage device 303, a register in the processor 301, and a cache memory in the processor 301 may function as the storage unit 290 in place of the memory 302 or together with the memory 302.

The attack tree generation device 300 may be provided with a plurality of processors that substitute for the processor 301. The plurality of processors share a role of the processor 301.

The attack tree generation program can computer readably recorded (stored) in a nonvolatile recording medium such as an optical disk and a flash memory.

\*\*\*Description of Operations\*\*\*

An attack tree generation method will be described with referring to FIG. 16.

In step S310, the system dividing unit 110 divides a target system into a plurality of sub-systems based on a system configuration data 191.

Step S310 is the same as step S110 in Embodiment 1.

In step S320, the dedicated inference rule generation unit 220 generates a dedicated inference rule in units of sub-systems. A plurality of dedicated inference rules corresponding to the plurality of sub-systems are thus generated. The plurality of dedicated inference rules to be generated will be referred to as a dedicated inference rule group.

A method of generating the dedicated inference rule of the sub-subsystem is the same as the method (step S211 to step S220) in Embodiment 2.

In step S330, the attack tree generation unit 310 generates an attack tree of the target system using the dedicated inference rule group.

A method of generating the attack tree of the target system is the same as the method (step S121 to step S141) in Embodiment 1. Generation of the attack tree of the sub-system employs the dedicated inference rule of the sub-system.

In step S340, the attack tree generation unit 310 outputs the attack tree of the target system.

For example, the attack tree generation unit 310 displays the attack tree of the target system to the display.

Effect of Embodiment 3

In Embodiment 3, since the effects of both of Embodiment 1 and Embodiment 2 can be obtained, an amount of calculation necessary for generating the attack tree can be further reduced.

Embodiment 4

Figure 17:
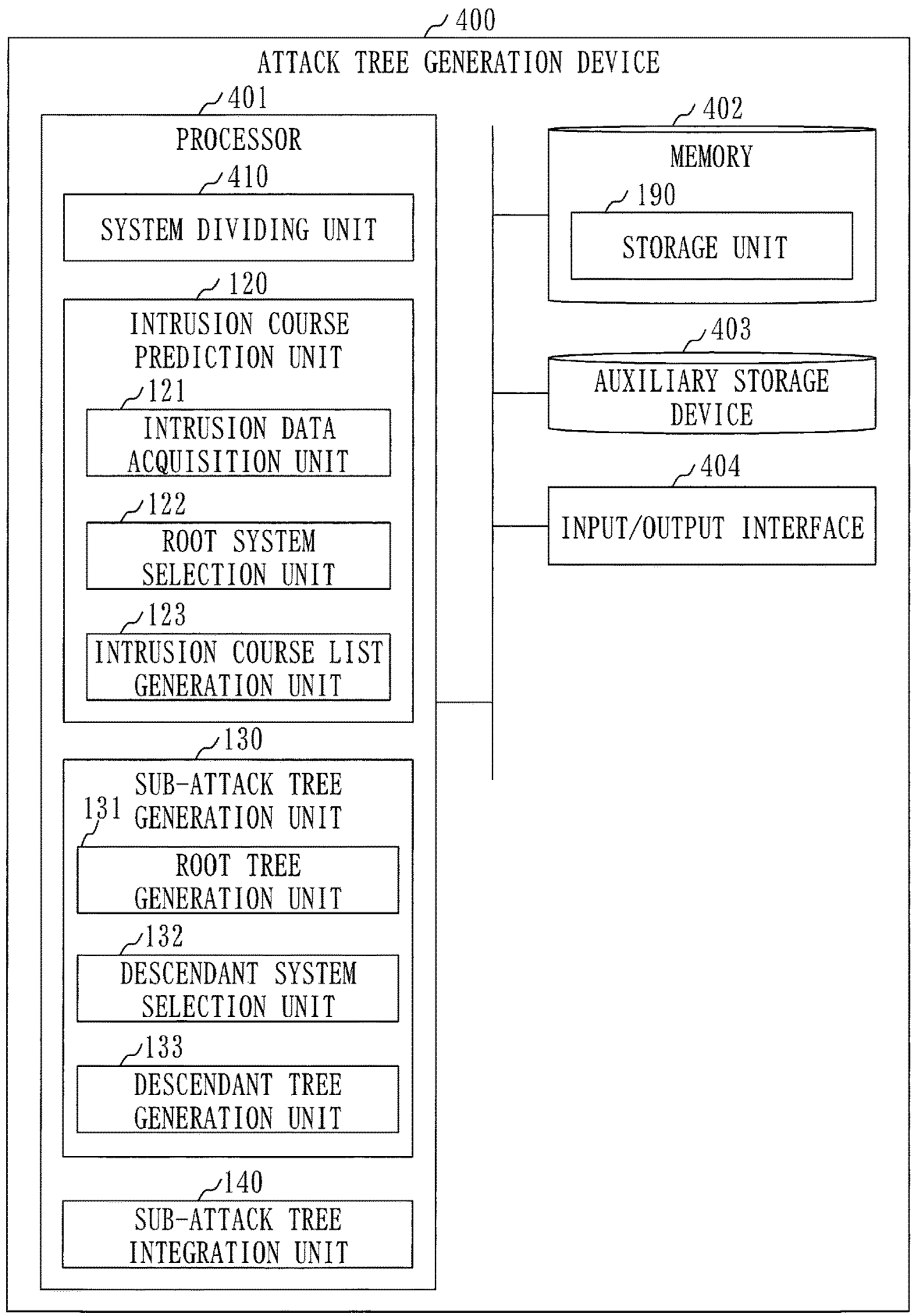
FIG. 17 is a configuration diagram of an attack tree generation device 400 in Embodiment 4.

An attack tree generation device 400 will be described with referring to FIGS. 17 to 19 mainly regarding its difference from Embodiment 1.

The attack tree generation device 400 divides a target system into a plurality of sub-systems automatically.

*Description of Configurations*

A configuration of the attack tree generation device 400 will be described with referring to FIG. 17.

The attack tree generation device 400 is a computer provided with hardware devices such as a processor 401, a memory 402, an auxiliary storage device 403, and an input/output interface 404. These hardware devices are connected to each other via signal lines.

The processor 401 is an IC that performs computation processing, and controls the other hardware devices. The processor 401 is, for example, a CPU, a DSP, or a GPU.

The memory 402 is a volatile storage device. The memory 402 is called a main storage device or a main memory as well. The memory 402 is, for example, a RAM. Data stored in the memory 402 is saved in the auxiliary storage device 403 as necessary.

The auxiliary storage device 403 is a nonvolatile storage device. The auxiliary storage device 403 is, for example, a ROM, an HDD, or a flash memory. Data stored in the auxiliary storage device 403 is loaded into the memory 402 as necessary.

The input/output interface 404 is a port to which an input device and an output device are connected. For example, the input/output interface 404 is a USB terminal, the input device includes a keyboard and a mouse, and the output device is a display.

The attack tree generation device 400 is provided with elements such as a system dividing unit 410, an intrusion course prediction unit 120, a sub-attack tree generation unit 130, and a sub-attack tree integration unit 140. These elements are implemented by software.

The system dividing unit 410 is an element corresponding to the system dividing unit 110 in Embodiment 1.

The intrusion course prediction unit 120, the sub-attack tree generation unit 130, and the sub-attack tree integration unit 140 are individually elements in Embodiment 1.

An attack tree generation program to cause the computer to function as the system dividing unit 410, the intrusion course prediction unit 120, the sub-attack tree generation unit 130, and the sub-attack tree integration unit 140 is stored in the auxiliary storage device 403. The attack tree generation program is loaded into the memory 402 and executed by the processor 401.

Furthermore, an OS is stored in the auxiliary storage device 403. At least part of the OS is loaded into the memory 402 and executed by the processor 401.

That is, the processor 401 executes the attack tree generation program while executing the OS.

Input/output data of the attack tree generation program is stored in a storage unit 190. The storage unit 190 is an element in Embodiment 1.

The memory 402 functions as the storage unit 190. Alternatively, a storage device such as the auxiliary storage device 403, a register in the processor 401, and a cache memory in the processor 401 may function as the storage unit 190 in place of the memory 402 or together with the memory 402.

The attack tree generation device 400 may be provided with a plurality of processors that substitute for the processor 401. The plurality of processors share a role of the processor 401.

The attack tree generation program may be computer readably recorded (stored) in a nonvolatile recording medium such as an optical disk and a flash memory.

*Description of Operations*

Figure 18:
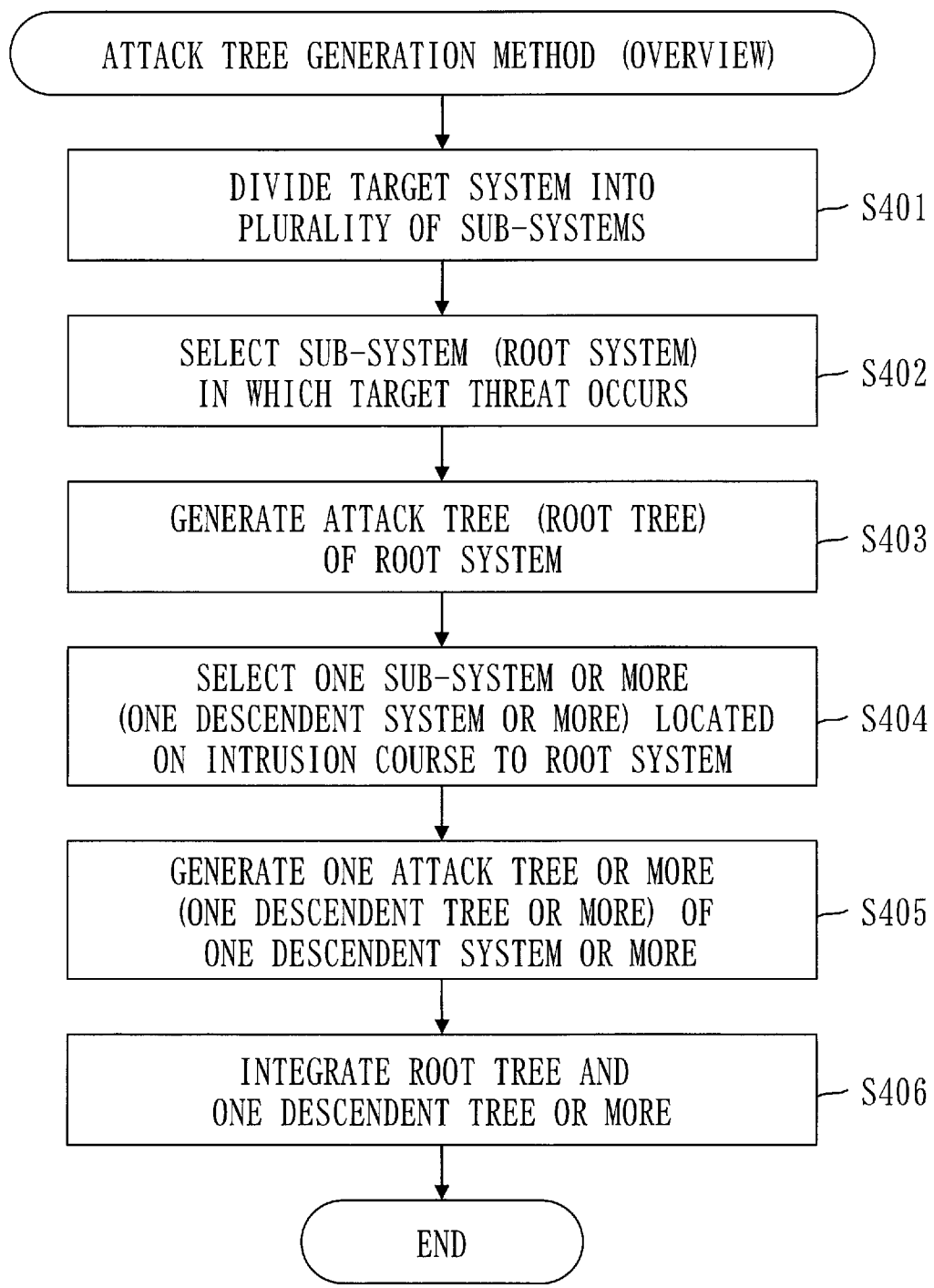
FIG. 18 is a flowchart of an attack tree generation method (overview) in Embodiment 4.
Figure 19:
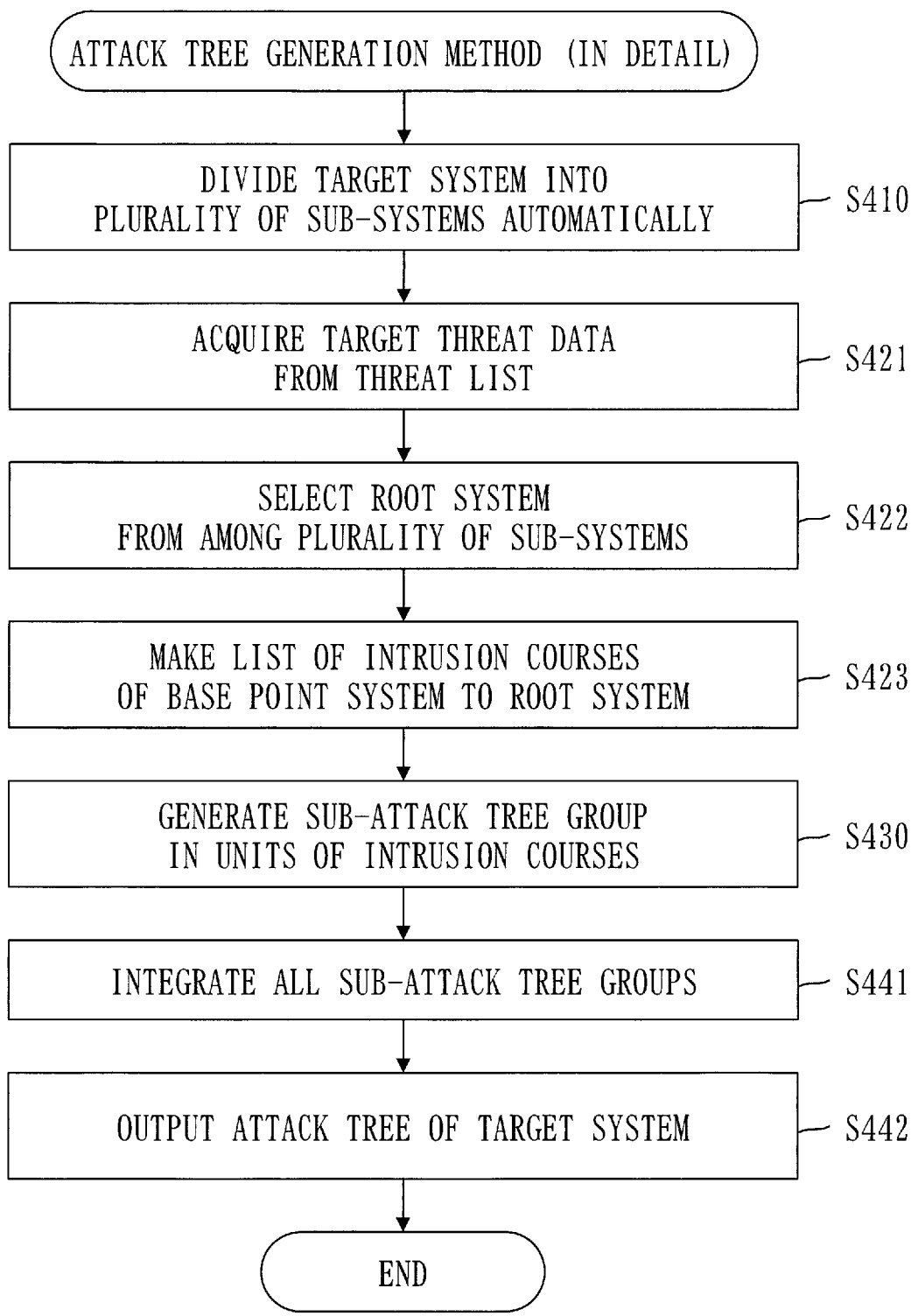
FIG. 19 is a flowchart of the attack tree generation method (in detail) in Embodiment 4.

An overview of an attack tree generation method will be referred to with referring to FIG. 18.

In step S401, the system dividing unit 410 divides the target system into a plurality of sub-systems based on system configuration data 191.

The system dividing unit 410 divides the target system as follows.

The system configuration data 191 indicates a plurality of devices that perform communication and one communication path or more that connect the plurality of devices, as a configuration of the target system.

First, the system dividing unit 410 generates a system configuration graph based on the system configuration data 191. The system configuration graph is a graph that expresses the target system, and includes a plurality of nodes expressing the plurality of devices, and one edge or more expressing the one communication path or more.

Subsequently, the system dividing unit 410 assesses centrality discussed in a graph theory, about each node in the system configuration graph.

Subsequently, the system dividing unit 410 determines one node or more to serve as a dividing point of the target system based on an assessment result.

Then, the system dividing unit 410, with making each of the determined one node or more a dividing point, divides the target system expressed by the system configuration graph into a plurality of sub-systems.

Step S402 to step S406 are the same as step S102 to step S106 in Embodiment 1.

The attack tree generation method will be described in detail with referring to FIG. 19.

In step S410, the system dividing unit 410 divides the target system into the plurality of sub-systems based on the system configuration data 191 automatically.

Step S410 corresponds to step S110 in Embodiment 1.

Step S410 will be described in comparison with step S110.

In step S110, divisions according to the methods (1) to (3) were described.

(1) Division that uses as a boundary a security device such as a firewall.
(2) Division based on grouping in units of device types.
(3) Division based on a dividing point designated by a user.

Note that with the method (1) or (2), a developer selects a security device or a device type for the division. Accordingly, a developer cost is required.

With the method (3), the user selects a dividing point (device) from the system configuration for division. Accordingly, a user cost is required.

That is, with the methods (1) to (3), some advance preparation is necessary for division. Accordingly, a cost of advance preparation is required.

In step S410, division as follows is performed in order to reduce the cost of advance preparation.

The system dividing unit 410 generates a system configuration graph based on the system configuration data 191. In the system configuration graph, each node expresses a device, and each edge expresses a communication path. The system dividing unit 410 assesses a feature amount of each node to thereby determine the dividing point automatically.

Specifically, the system dividing unit 410 utilizes "intermediation centrality", which is one of centralities discussed in the graph theory.

An intermediation centrality of a target node is an assessment result of a proportion of target nodes included in the shortest course between nodes in a whole graph. If the intermediation centrality has a high value, it is judged that highly likely the target node is a relay point between the nodes and serves as a connector of communities.

Therefore, by assessing the intermediation centrality, the system dividing unit 410 can automatically identify a node (device) serving as a connector of communities (sub-systems).

In general, when analyzing security, a network configuration of a target system is given as information. Hence, information of a node and information of an edge, which are each information indispensable for calculating an intermediation centrality, are available. Specifically, indispensable information is available from the system configuration data 191.

This scheme does not depend on a system type such as IT, instrumentation, and in-vehicle device and can be applied widely.

Intermediation centrality is calculated at a comparatively high speed for the system scale. An amount of calculation of the intermediation centrality is expressed by O ($N^2+N \times M$) where "N" signifies a number of nodes and "M" signifies a number of edges.

In addition, it is anticipated that by division based on the intermediation centrality, consequently, the target system will be divided appropriately. The reason for this is as follows.

As a premise, note that a calculation time required for attack tree generation depends on a length of an intrusion course in analyzing an attack scenario and increases on the order of square of a polynomial. Then, the intermediation centrality of each node (device) is assessed by a calculation formula of the intermediation centrality. When considering a shortest course between two arbitrary points in the whole graph, the higher the proportion of the target nodes included in the shortest course, the higher the assessment result on the target node. Therefore, it is estimated that if the target system is divided by a device having a high intermediation centrality, a number of intrusion courses after division increases in the whole intrusion course.

The system dividing unit 410 may employ a centrality other than intermediation centrality, as a centrality in the graph theory, for assessment of the dividing point.

For example, the system dividing unit 410 may employ a centrality such as degree centrality and PageRank, for assessing the dividing point.

Note that from the above consideration, use of intermediation centrality will enhance the effect more.

Effect of Embodiment 4

Embodiment 4 can automatize system division. As a result, an effect that is efficient calculation can be obtained. Furthermore, a developer cost in development of the attack tree generation device 400 and a user cost in use of the attack tree generation device 400 can be reduced.

Embodiment 5

Figure 20:
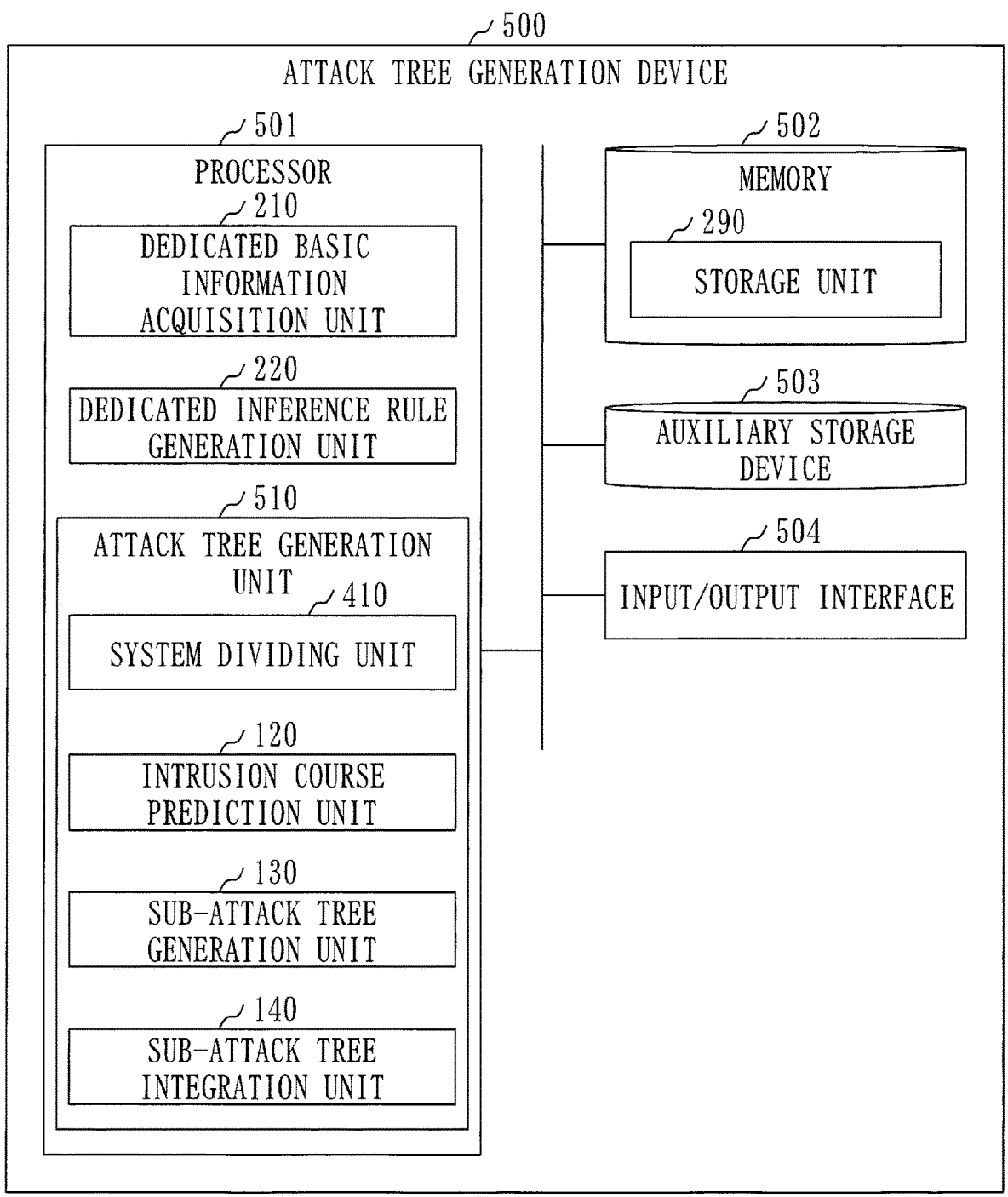
FIG. 20 is a configuration diagram of an attack tree generation device 500 in Embodiment 5.
Figure 21:
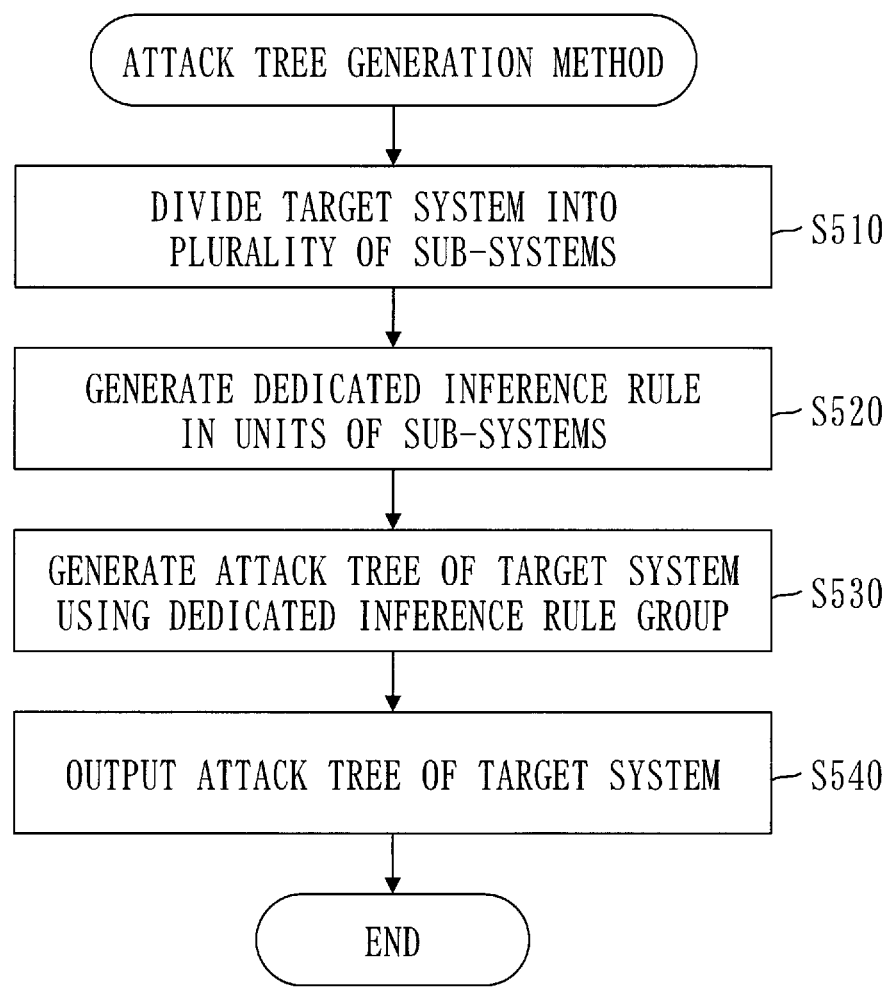
FIG. 21 is a flowchart of an attack tree generation method in Embodiment 5.

An attack tree generation device 500 will be described with referring to FIGS. 20 and 21 mainly regarding its difference from Embodiment 4.

The attack tree generation device 500 is a combination of the attack tree generation device 400 (Embodiment 4) and the attack tree generation device 200 (Embodiment 2).

A configuration of the attack tree generation device 500 will be described with referring to FIG. 20.

The attack tree generation device 500 is a computer provided with hardware devices such as a processor 501, a memory 502, an auxiliary storage device 503, and an input/output interface 504. These hardware devices are connected to each other via signal lines.

The processor 501 is an IC that performs computation processing, and controls the other hardware devices. The processor 501 is, for example, a CPU, a DSP, or a GPU.

The memory 502 is a volatile storage device. The memory 502 is called a main storage device or a main memory as well. The memory 502 is, for example, a RAM. Data stored in the memory 502 is saved in the auxiliary storage device 503 as necessary.

The auxiliary storage device 503 is a nonvolatile storage device. The auxiliary storage device 503 is, for example, a ROM, an HDD, or a flash memory. Data stored in the auxiliary storage device 503 is loaded into the memory 502 as necessary.

The input/output interface 504 is a port to which an input device and an output device are connected. For example, the input/output interface 504 is a USB terminal, the input device includes a keyboard and a mouse, and the output device is a display.

The attack tree generation device 500 is provided with elements such as a dedicated basic information acquisition unit 210, a dedicated inference rule generation unit 220, and an attack tree generation unit 510. These elements are implemented by software.

The attack tree generation unit 510 is provided with a system dividing unit 410, an intrusion course prediction unit 120, a sub-attack tree generation unit 130, and a sub-attack tree integration unit 140.

The system dividing unit 410 is an element in Embodiment 4.

The intrusion course prediction unit 120, the sub-attack tree generation unit 130, and the sub-attack tree integration unit 140 are individually elements in Embodiment 1.

The dedicated basic information acquisition unit 210 and the dedicated inference rule generation unit 220 are individually elements in Embodiment 2.

An attack tree generation program to cause the computer to function as the dedicated basic information acquisition unit 210, the dedicated inference rule generation unit 220, and the attack tree generation unit 510 is stored in the auxiliary storage device 503. The attack tree generation program is loaded into the memory 502 and executed by the processor 501.

Furthermore, an OS is stored in the auxiliary storage device 503. At least part of the OS is loaded into the memory 502 and executed by the processor 501.

That is, the processor 501 executes the attack tree generation program while executing the OS.

Input/output data of the attack tree generation program is stored in a storage unit 290. The storage unit 290 is an element in Embodiment 2.

The memory 502 functions as the storage unit 290. Alternatively, a storage device such as the auxiliary storage device 503, a register in the processor 501, and a cache memory in the processor 501 may function as the storage unit 290 in place of the memory 502 or together with the memory 502.

The attack tree generation device 500 may be provided with a plurality of processors that substitute for the processor 501. The plurality of processors share a role of the processor 501.

The attack tree generation program can be computer readably recorded (stored) in a nonvolatile recording medium such as an optical disk and a flash memory.

Description of Operations

An attack tree generation method will be described with referring to FIG. 21.

In step S510, the system dividing unit 410 divides a target system into a plurality of sub-systems based on the system configuration data 191.

Step S510 is the same as step S410 in Embodiment 4.

In step S520, the dedicated inference rule generation unit 220 generates a dedicated inference rule in units of sub-systems. A plurality of dedicated inference rules corresponding to the plurality of sub-systems are thus generated. The plurality of dedicated inference rules to be generated will be referred to as a dedicated inference rule group.

A method of generating the dedicated inference rule of the sub-system is the same as the method (step S211 to step S220) in Embodiment 2.

In step S530, the attack tree generation unit 510 generates the attack tree of the target system using the dedicated inference rule group.

A method of generating the attack tree of the target system is the same as the method (step S121 to step S141) in Embodiment 1. Generation of the attack tree of the sub-system employs the dedicated inference rule of the sub-system.

In step S540, the attack tree generation unit 510 outputs the attack tree of the target system.

For example, the attack tree generation unit 510 displays the attack tree of the target system to the display.

Effect of Embodiment 5

In Embodiment 5, since the effects of both of Embodiment 4 and Embodiment 2 can be obtained, an amount of calculation necessary for generating the attack tree can be further reduced.

CONCLUSION OF EMBODIMENTS

An attack tree automatic generation tool is proposed as a technique to support a security countermeasure. This tool can generate an attack tree only by inputting information of a target system to the tool. A system developer can examine a security countermeasure proposal by checking the generated attack tree. That is, the attack tree helps in safe system development.

Conventionally, an attack tree automatic generation tool of a logical inference type exists. This tool performs inference by collating an occurrence condition of a cyber attack and configuration information of a target system. An attack tree is thus generated. However, the attack tree automatic generation tool of the logical inference type has a problem that an amount of calculation increases on the order of polynomials for a scale of the system.

In the embodiments, an attack tree generation task achieves high efficiency by the following two techniques. (1) Dividing a target system into a plurality of sub-systems and integrating a plurality of sub-attack trees corresponding to the plurality of sub-systems. (2) In generation of an attack tree (or a sub-attack tree), automatically generating an inference rule restricted to a system type, thereby reducing a size of the inference rule.

With the embodiments, an attack tree can be generated at a high speed of a multiple of polynomials according to a number that divides the target system. As a result, a reduction of a system development time period including a security countermeasure can be expected.

SUPPLEMENTARY TO EMBODIMENTS

Figure 22:
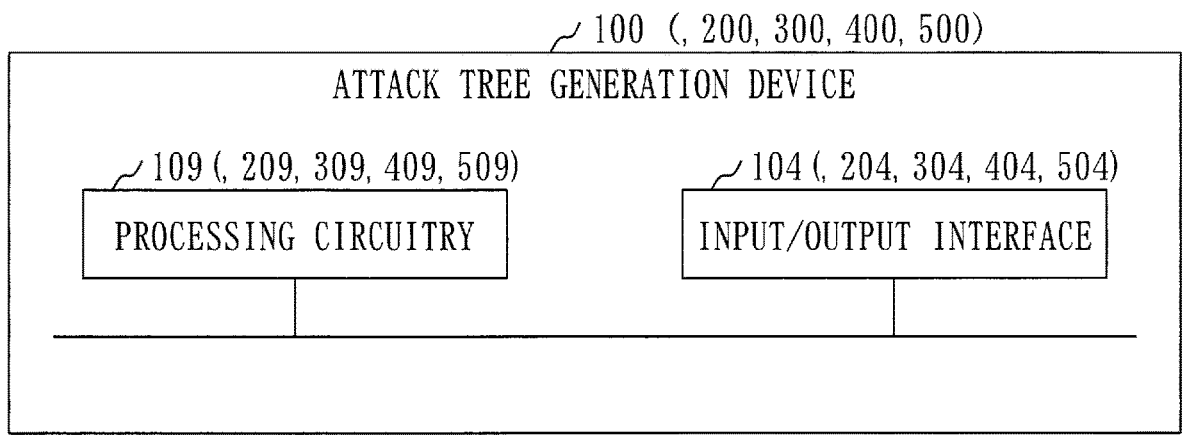
FIG. 22 is a hardware configuration diagram of the attack tree generation device (100, 200, 300) in embodiments.

A hardware configuration of the attack tree generation device (100, 200, 300, 400, 500) will be described with referring to FIG. 22.

The attack tree generation device 100 is provided with processing circuitry 109.

The processing circuitry 109 is hardware that implements the system dividing unit 110, the intrusion course prediction unit 120, the sub-attack tree generation unit 130, and the sub-attack tree integration unit 140.

The processing circuitry 109 may be dedicated hardware or may be the processor 101 that implements the program stored in the memory 102.

The attack tree generation device 200 is provided with processing circuitry 209.

The processing circuitry 209 is hardware that implements the dedicated basic information acquisition unit 210, the dedicated inference rule generation unit 220, and the attack tree generation unit 230.

The processing circuitry 209 may be dedicated hardware or may be the processor 201 that implements the program stored in the memory 202.

The attack tree generation device 300 is provided with processing circuitry 309.

The processing circuitry 309 is hardware that implements the dedicated basic information acquisition unit 210, the dedicated inference rule generation unit 220, and the attack tree generation unit 310.

The processing circuitry 309 may be dedicated hardware or may be the processor 301 that implements the program stored in the memory 302.

The attack tree generation device 400 is provided with processing circuitry 409.

The processing circuitry 409 is hardware that implements the system dividing unit 410, the intrusion course prediction unit 120, the sub-attack tree generation unit 130, and the sub-attack tree integration unit 140.

The processing circuitry 409 may be dedicated hardware or may be the processor 401 that implements the program stored in the memory 402.

The attack tree generation device 500 is provided with processing circuitry 509.

The processing circuitry 509 is hardware that implements the dedicated basic information acquisition unit 210, the dedicated inference rule generation unit 220, and the attack tree generation unit 510.

The processing circuitry 509 may be dedicated hardware or the processor 501 that implements the program stored in the memory 502.

When the processing circuitry (109, 209, 309, 409, 509) is dedicated hardware, the processing circuitry is, for example, a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

Note that ASIC stands for Application Specific Integrated Circuit, and FPGA stands for Field Programmable Gate Array.

The attack tree generation device (100, 200, 300, 400, 500) may be provided with a plurality of processing circuitries that substitute for the processing circuitry (109, 209, 309, 409, 509). The plurality of processing circuitries share a role of the processing circuitry (109, 209, 309, 409, 509).

In the attack tree generation device (100, 200, 300, 400, 500), some of the functions may be implemented by hardware, and the remaining functions may be implemented by software or firmware.

In this manner, the processing circuitry (109, 209, 309, 409, 509) can be implemented by hardware, software, or firmware; or a combination of hardware, software, and firmware.

Each embodiment is an exemplification of a preferred mode, and is not intended to limit the technical scope of the present invention. Each embodiment may be practiced partly, or may be practiced in combination with another embodiment. The procedures explained with using the flowcharts and so on may be changed appropriately.

The attack tree generation device (100, 200, 300, 400, 500) may be implemented by a plurality of devices. Namely, the attack tree generation device may be implemented as a system.

A term "unit", which signifies part of the attack tree generation device (100, 200, 300, 400, 500), may be replaced by "process" or "phase".

REFERENCE SIGNS LIST

100: attack tree generation device; 101: processor; 102: memory; 103: auxiliary storage device; 104: input/output interface; 109: processing circuitry; 110: system dividing unit; 120: intrusion course prediction unit; 121: intrusion data acquisition unit; 122: root system selection unit; 123: intrusion course list generation unit; 130: sub-attack tree generation unit; 131: root tree generation unit; 132: descendant system selection unit; 133: descendant tree generation unit; 140: sub-attack tree integration unit; 190: storage unit; 191: system configuration data; 192: threat list; 193: inference rule; 194: intrusion course list; 200: attack tree generation device; 201: processor; 202: memory; 203: auxiliary storage device; 204: input/output interface; 209: processing circuitry; 210: dedicated basic information acquisition unit; 220: dedicated inference rule generation unit; 230: attack tree generation unit; 290: storage unit; 291: system configuration data; 292: threat list; 293: inference rule; 294: intrusion course list; 295: rule basic information database; 2951: threat database; 2952: attack technique database; 300: attack tree generation device; 301: processor; 302: memory; 303: auxiliary storage device; 304: input/output interface; 309: processing circuitry; 310: attack tree generation unit; 400: attack tree generation device; 401: processor; 402: memory; 403: auxiliary storage device; 404: input/output interface; 409: processing circuitry; 410: system dividing unit; 500: attack tree generation device; 501: processor; 502: memory; 503: auxiliary storage device; 504: input/output interface; 509: processing circuitry; 510: attack tree generation unit; 900: attack tree; 901: descendent tree group; 902: logical disjunction gate; 903: brother tree; 904: common node; 910: root tree; 911: root node; 912: internal node; 913: terminal node; 914: logical gate; 920: child tree; 921: root node; 923: terminal node; 924: logical gate.

The invention claimed is:

1. An attack tree generation device comprising:
processing circuitry
to divide a target system that is a target of a security countermeasure, into a plurality of sub-systems based on system configuration data indicating a configuration of the target system,
to select a sub-system in which a threat on security in the target system occurs, as a root system from among the plurality of sub-systems based on threat data indicating a content of the threat,
to execute an attack tree generation process on the root system, to thereby generate an attack tree of the root system as a root tree,
to select one sub-system or more located on an intrusion course to the root system in the target system, as one descendent system or more from among the plurality of sub-systems based on intrusion course data indicating the intrusion course,
to execute the attack tree generation process on each of the one descendent system or more, to thereby generate one attack tree or more corresponding to the one descendent system or more, as one descendent tree or more, and
to integrate the root tree and the one descendent tree or more, to thereby generate an attack tree of the target system.

2. The attack tree generation device according to claim 1, wherein the system configuration data indicates a plurality of devices that perform communication and one communication path or more that connect the plurality of devices, as a configuration of the target system, and
wherein the processing circuitry generates a system configuration graph expressing the target system to include a plurality of nodes and one edge or more, based on the system configuration data, the plurality of nodes expressing the plurality of devices, the one edge or more expressing the one communication path or more, assesses centrality discussed in a graph theory, about each node in the system configuration graph, determines one node or more to serve as a dividing point of the target system based on an assessment result, and with making each of the determined one node or more a dividing point, divides the target system expressed by the system configuration graph into the plurality of sub-systems.

3. The attack tree generation device according to claim 1, wherein the processing circuitry generates an attack tree having a root node expressing the threat, as the root tree.

4. The attack tree generation device according to claim 3, wherein the processing circuitry, with making a node expressing the threat a root node, starts the attack tree generation process, and at a stage where an intrusion node signifying intrusion into the root system appears individually in one course or more included in an attack tree being generated, with making the intrusion node appearing in the individual course a terminal node in the course, suspends the attack tree generation process, to thereby generate the root tree.

5. The attack tree generation device according to claim 4, wherein the processing circuitry
treats the root system as a parent system, and selects a sub-system located one position before the parent system on the intrusion course, as a child system, and
treats the root tree as a parent tree, then with making each of one terminal node or more of the parent tree a root node, starts the attack tree generation process, and at a stage where an intrusion node signifying intrusion into the child system appears individually in one course or more included in an attack tree being generated, with making the intrusion node appearing in the individual course a terminal node in the course, suspends the attack tree generation process, to thereby generate one child tree or more.

6. The attack tree generation device according to claim 5, wherein the processing circuitry
treats a last-time child system as a this-time parent system, and selects a sub-system located one position before the this-time parent system on the intrusion course, as a this-time child system, and
treats each of last-time one child tree or more as a this-time parent tree, then with making each of one terminal node or more of the this-time parent tree a root node, starts an attack tree generation process, and at a stage where an intrusion node signifying intrusion into the this-time child system appears individually in one course or more included in an attack tree being generated, with making the intrusion node appearing in the individual course a terminal node in the course, suspends the attack tree generation process, to thereby generate one child tree or more for the this-time parent tree.

7. The attack tree generation device according to claim 5, wherein the processing circuitry
when there are a plurality of intrusion courses to the root system in the target system, selects a descendent system group being one descendent system or more, in units of intrusion courses,
generates a descendent tree group being one descendent tree or more, in units of descendent system groups, and
searches a plurality of descendent tree groups corresponding to the plurality of intrusion courses, to thereby find brother trees being a plurality of child trees each having the same root node as that of a common terminal node of a common parent tree, and connects individual root nodes of the brother trees to the common terminal node via a logical disjunction gate.

8. The attack tree generation device according to claim 4, wherein the processing circuitry
treats the root system as a parent system, and selects a sub-system located one position before the parent system on the intrusion course, as a child system, and
treats the root tree as a parent tree, divides one terminal node or more of the parent tree into one terminal node group or more, then with making each of one terminal node group or more of the parent tree a root node, starts an attack tree generation process, and at a stage where an intrusion node signifying intrusion into the child system appears individually in one course or more included in an attack tree being generated, with making the intrusion node appearing in the individual course a terminal node in the course, suspends the attack tree generation process, to thereby generate one child tree or more.

9. The attack tree generation device according to claim 8, wherein the processing circuitry
treats a last-time child system as a this-time parent system, and selects a sub-system located one position before the this-time parent system on the intrusion course, as a this-time child system, and
treats each of last-time one child tree or more as a this-time parent tree, divides one terminal node or more of the this-time parent tree into one terminal node group or more, then with making each of the one terminal node group or more of the this-time parent tree a root node, starts an attack tree generation process, and at a stage where an intrusion node signifying intrusion into the this-time child system appears individually in one course or more included in an attack tree being generated, with making the intrusion node appearing in the individual course a terminal node in the course, suspends the attack tree generation process, to thereby generate one child tree or more for the this-time parent tree.

10. The attack tree generation device according to claim 1, wherein the processing circuitry
acquires rule basic information corresponding to a type of the root system, as root system basic information from a rule basic information database in which a plurality of system types and a plurality of pieces of rule basic information are associated with each other, and acquires rule basic information corresponding to a type of each descendant system, as descendant system basic information from the rule basic information database,
executes an inference rule generation process using only the root system basic information among the plurality of pieces of rule basic information, to thereby generate a root system inference rule, and executes the inference rule generation process using only each descendent system basic information among the plurality of pieces of rule basic information, to thereby generate each descendent system inference rule,
executes the attack tree generation process using the root system inference rule, to thereby generate the root tree, and
executes the attack tree generation process using each descendent system inference rule, to thereby generate each descendent tree.

11. An attack tree generation method comprising:
dividing a target system that is a target of a security countermeasure, into a plurality of sub-systems based on system configuration data indicating a configuration of the target system;

selecting a sub-system in which a threat on security in the target system occurs, as a root system from among the plurality of sub-systems based on threat data indicating a content of the threat;

executing an attack tree generation process on the root system, to thereby generate an attack tree of the root system, as a root tree;

selecting one sub-system or more located on an intrusion course to the root system in the target system, as one descendent system or more from among the plurality of sub-systems based on intrusion course data indicating the intrusion course;

executing the attack tree generation process on each of the one descendent system or more, to thereby generate one attack tree or more corresponding to the one descendent system or more, as one descendent tree or more; and integrating the root tree and the one descendent tree or more, to thereby generate an attack tree of the target system.

12. A non-transitory computer-readable medium storing an attack tree generation program which causes a computer to execute:

a system dividing process of dividing a target system that is a target of a security countermeasure, into a plurality of sub-systems based on system configuration data indicating a configuration of the target system;

a root system selection process of selecting a sub-system in which a threat on security in the target system occurs, as a root system from among the plurality of sub-systems based on threat data indicating a content of the threat;

a root tree generation process of executing an attack tree generation process on the root system, to thereby generate an attack tree of the root system as a root tree;

a descendant system selection process of selecting one sub-system or more located on an intrusion course to the root system in the target system, as one descendant system or more from among the plurality of sub-systems based on intrusion course data indicating the intrusion course;

a descendant tree generation process of executing the attack tree generation process on each of the one descendent system or more, to thereby generate one attack tree or more corresponding to the one descendent system or more, as one descendent tree or more; and a sub-attack tree integration process of integrating the root tree and the one descendent tree or more, to thereby generate an attack tree of the target system.

* * * * *